United States Patent
Wehling

(10) Patent No.: US 11,225,179 B2
(45) Date of Patent: *Jan. 18, 2022

(54) SLIDING SLEEVE AND HEADREST ARRANGEMENT

(71) Applicant: Adient Luxembourg Holding S.à r.l., Luxembourg (LU)

(72) Inventor: Karsten Wehling, Burscheid (DE)

(73) Assignee: Adient Luxembourg Holding S.a.r.l., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 16/431,839

(22) Filed: Jun. 5, 2019

(65) Prior Publication Data

US 2019/0283641 A1 Sep. 19, 2019

Related U.S. Application Data

(63) Continuation-in-part of application No. 15/348,263, filed on Nov. 10, 2016, now Pat. No. 10,351,032.

(30) Foreign Application Priority Data

| Nov. 13, 2015 | (DE) | 10 2015 222 453.8 |
| Feb. 18, 2016 | (DE) | 10 2016 202 538.4 |
| May 19, 2016 | (DE) | 10 2016 208 608.1 |

(51) Int. Cl.
   *B60N 2/826* (2018.01)
(52) U.S. Cl.
   CPC ............ *B60N 2/826* (2018.02)

(58) Field of Classification Search
   CPC ...... B60N 2/4808; B60N 2/809; B60N 2/826; B60N 2/897
   See application file for complete search history.

(56) References Cited

U.S. PATENT DOCUMENTS

| 5,667,276 A * | 9/1997 | Connelly | B60N 2/815 297/410 |
| 5,788,250 A * | 8/1998 | Masters | B60N 2/826 297/410 |
| 7,434,886 B2 * | 10/2008 | Yamada | B60N 2/818 297/410 |
| 7,600,818 B2 * | 10/2009 | Ebbeskotte | B60N 2/815 297/408 |
| 7,758,115 B2 * | 7/2010 | Yamaguchi | B60N 2/888 297/216.12 |
| 9,782,007 B2 * | 10/2017 | Takahashi | B60N 2/809 |
| 10,351,032 B2 * | 7/2019 | Wehling | B60N 2/809 |
| 2007/0221373 A1 * | 9/2007 | Murray | E21B 23/02 166/192 |
| 2015/0165945 A1 * | 6/2015 | Takahashi | B60N 2/809 297/404 |
| 2015/0306994 A1 * | 10/2015 | Kitou | B60N 2/80 297/408 |
| 2015/0329021 A1 * | 11/2015 | Aquillue | B60N 2/80 297/391 |
| 2016/0166064 A1 * | 6/2016 | Takahashi | B60N 2/809 297/404 |

* cited by examiner

*Primary Examiner* — Philip F Gabler
(74) *Attorney, Agent, or Firm* — Marshall & Melhorn, LLC

(57) ABSTRACT

A sliding sleeve (6, 60) for fixing in a securing support (5, 50). The sliding sleeve (6, 60) includes a sleeve body (6.2, 60.2) with a coupling section (6.3, 60.3) with at least one flexible coupling face (6.4, 60.4) for bearing against the securing body (5, 50).

25 Claims, 24 Drawing Sheets

SLIDING SLEEVE AND HEADREST ARRANGEMENT

CROSS REFERENCE TO RELATED APPLICATIONS

This application claims the benefit of priority under 35 U.S.C. § 120 of U.S. patent application Ser. No. 15/348,263 which claims the benefit of priority under 35 U.S.C. § 119 of German Applications DE 10 2015 222 453.8 filed Nov. 13, 2015 and DE 10 2016 202 538.4 filed Feb. 18, 2016 and DE 10 2016 208 608.1 filed May 19, 2016, the entire contents of which are incorporated herein by reference.

FIELD OF THE INVENTION

The invention relates to a sliding sleeve and to a headrest arrangement having a sliding sleeve of this type.

BACKGROUND OF THE INVENTION

Headrest arrangements which are known from the prior art comprise two headrest rods which are guided and held in securing supports for fastening to a backrest of a seat, which securing supports are arranged and held in the backrest. The securing supports are usually provided with sliding sleeves or sliding bushes for guiding the headrest rods in the securing supports.

SUMMARY OF THE INVENTION

It is an object of the present invention to specify a sliding sleeve which compensates for manufacturing and assembly tolerances between the sliding sleeve and the securing support. Moreover, it is an object of the invention to specify a headrest arrangement having a sliding sleeve of this type.

According to the invention, the sliding sleeve for fixing in a securing body has a sleeve body which has at least one coupling section with at least one flexible coupling face.

According to one development, the sleeve body has in each case one flange section on the end side and the at least one coupling section between the two end-side flange sections, the coupling section having at least one flexible coupling face. As an alternative, the sleeve body can have a flange section at one of the ends of the sleeve body, which is adjoined by the at least one coupling section.

In a further embodiment, the sleeve body extends over the entire length of the securing support.

Manufacturing tolerances between the sliding sleeve and the securing support can be compensated for by way of a coupling section of this type having a flexible coupling face. Here, the flexible coupling face forms a compensation element. Geometric influences on the internal diameter are minimized by way of an arrangement on the outer side of one or more flexible coupling faces or compensation elements on the sleeve body.

In one possible embodiment, the flexible coupling face is formed by a cavity in a wall in the coupling section of the sleeve body, as a result of which a manufacturing tolerance between the sliding sleeve and the securing support is compensated for further.

In a further embodiment, the cavity is covered to the outside by a flexible bridge wall. By means of the cavity, forces which act on the bridge wall can at least be absorbed during the installation of the sliding sleeve into a securing support. In an alternative embodiment, the cavity can be filled with a material which at least absorbs forces which act on the bridge wall. In addition, there is a frictional connection between the sliding sleeve and the securing support. This makes an improved press fit of the sliding sleeve in the securing support possible.

In one possible embodiment, the cavity is of radially circumferential configuration. According to one development, the cavity extends in the longitudinal direction of the sliding sleeve. As a result, a contact area of the sliding sleeve with the securing support is enlarged. As a result, forces which act on the sliding sleeve can be transmitted to the securing support in an improved manner.

In a further embodiment, the length of the cavity in the longitudinal direction is greater than the depth of the cavity in the wall. As a consequence, a transmission of force of the sliding sleeve is increased further.

In a further possible embodiment, the flexible bridge walls can be of outwardly curved configuration in the non-installed state. As a result, a force which the securing support exerts on the sliding sleeve in the installed state is increased. This leads to an improved absorption of part and manufacturing tolerances between the sliding sleeve and the securing support, and to an improved press fit of the sliding sleeve in the securing support.

In one development, the sliding sleeve is arranged in a securing support in the backrest in the installed state, the flexible coupling face being pressed onto the inner wall of the securing support. As a result, a manufacturing tolerance between the sliding sleeve and the securing support can be compensated for, and the sliding sleeve can be held in the securing support securely and with low noise.

In a further possible embodiment, the flexible bridge wall is pressed into the cavity. As a result, despite manufacturing tolerances, the sliding sleeve is held in the securing support securely and fixedly and, in particular, without rattling.

According to a further embodiment, the sliding sleeve is clamped or pressed in the securing support. As a result, a development of noise as a result of a movement of the sliding sleeve is reduced further.

In another possible embodiment, at least two flexible coupling faces are arranged above and/or next to one another in the longitudinal direction. By way of example, an associated cavity can be bridged by a flexible bridge wall in the case of every coupling face. As a result, the compensation of the part and manufacturing tolerance between the sliding sleeve and the securing support is increased.

Moreover, the outer surfaces of the flexible coupling faces can be beveled towards a centre axis of the sliding sleeve. In one development, the outer surfaces of the flexible coupling faces which are arranged above and/or next to one another can be configured in such a way that they are stepped with respect to one another. Here, the outer surfaces in the coupling section can be formed such that they are high and low alternately in the longitudinal direction. Manufacturing and part tolerances between the sliding sleeve and the securing support can be compensated for by way of a coupling section of flexible configuration of this type. The introduction of the sliding sleeve into a securing support can also be simplified.

Furthermore, the invention relates to a headrest arrangement, in particular for a seat for vehicles. The said headrest arrangement comprises two headrest rods which are spaced apart from one another in parallel, a headrest body which is fastened to the headrest rods, for example a headrest frame or a cushion, and two securing supports which are arrangeable and fixable in a frame of a backrest of the seat. Furthermore, the headrest arrangement comprises two sliding sleeves of the preceding exemplary embodiments which are arranged in the securing supports.

Exemplary embodiments of the invention will be explained in greater detail using drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
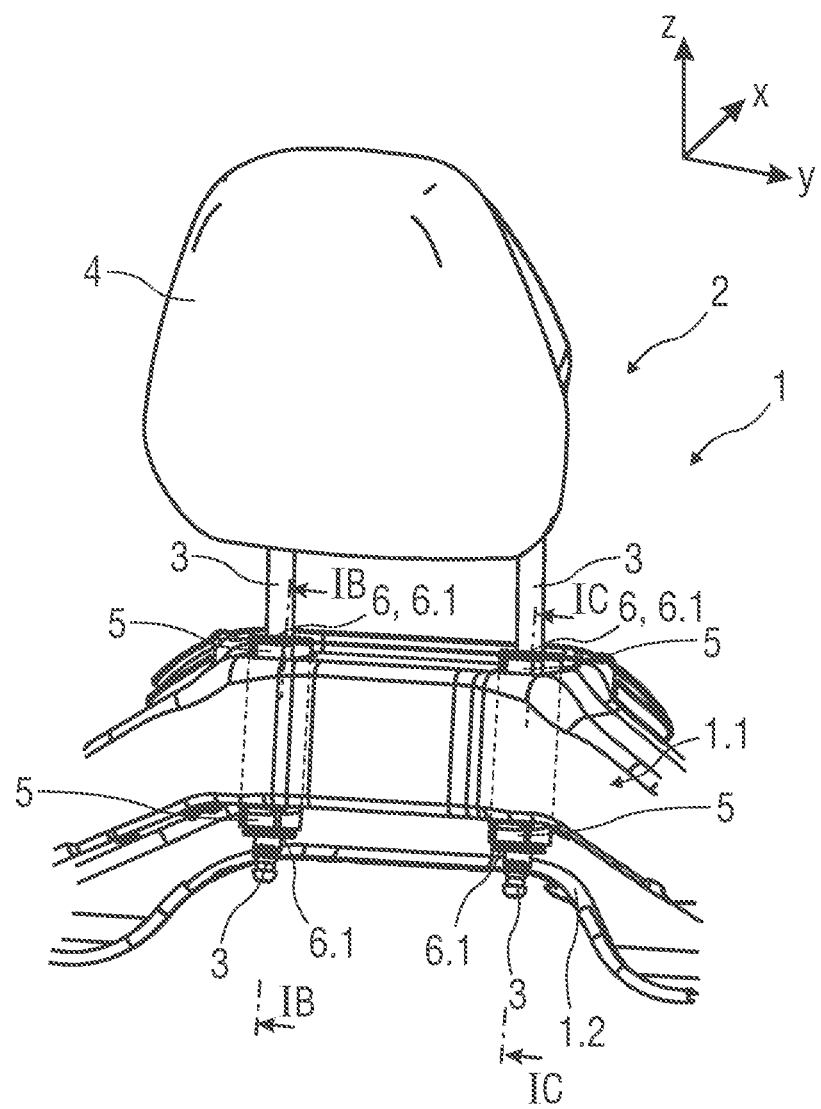
FIG. 1A is an enlarged illustration diagrammatically showing a part of a seat having a headrest arrangement which is arranged on a backrest.

Referring to the drawings, parts which correspond to one another are provided with the same reference numerals in all figures.

FIG. 1A diagrammatically shows an enlarged illustration of a part of a seat 1, in particular of a vehicle seat. The seat 1 comprises a backrest 1.1. In the exemplary embodiment, the backrest 1.1 is shown without cushion for improved illustration of the invention. A headrest arrangement 2 is arranged on the backrest 1.1.

In order to fasten the headrest arrangement 2 to the backrest 1.1, the headrest arrangement 2 comprises two headrest rods 3 which are spaced apart from one another in parallel and on which a headrest body 4, in particular a headrest cushion, is held. The headrest rods 3 are configured, for example, as metal rods, in particular steel rods. The headrest rods 3 can be configured separately or can be ends of a single-piece rod arrangement, for example a U-shaped rod bracket with two bracket limbs.

Figure 1B:
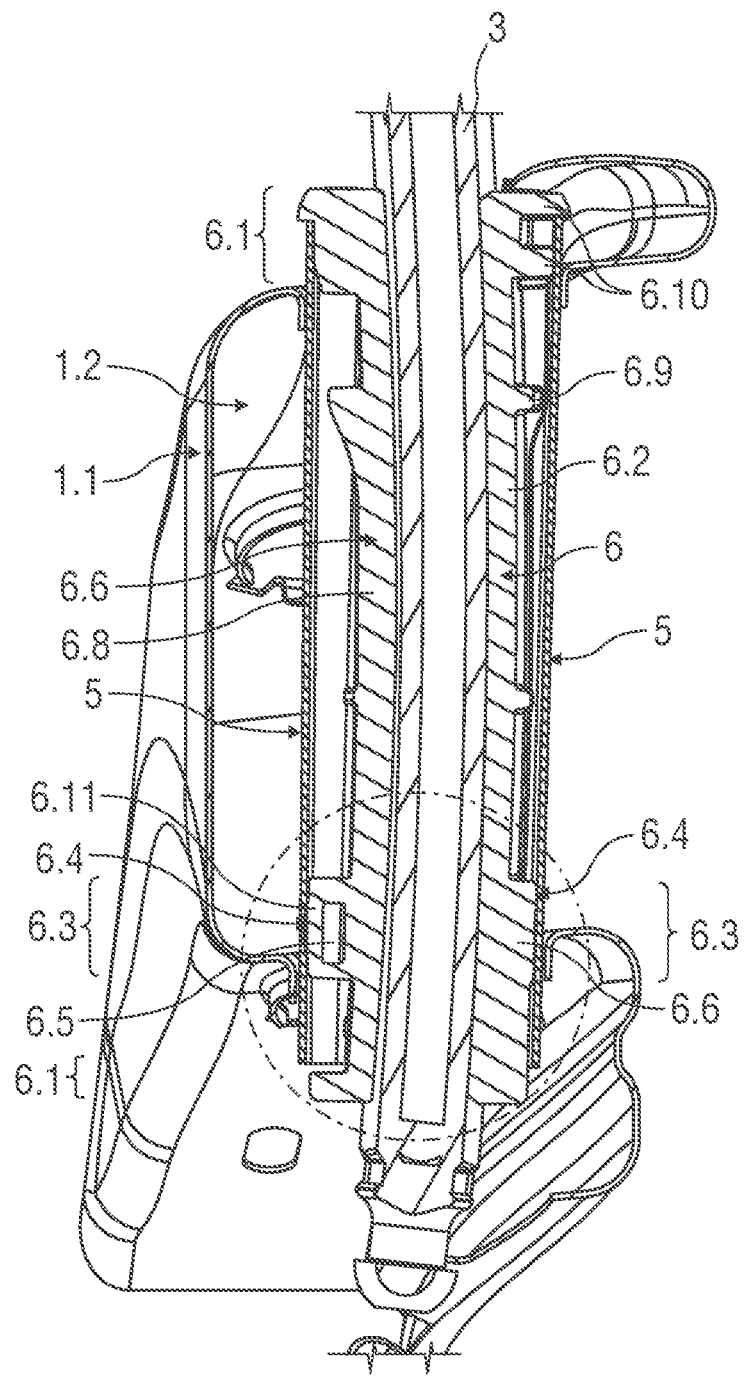
FIG. 1B is a sectional illustration diagrammatically showing the headrest arrangement in the region of a securing support having a sliding sleeve for a headrest rod.

The two headrest rods 3 are held in the backrest 1.1 in two securing supports 5. The securing supports 5 are metal sleeves which are arranged and fixed in a frame 1.2 of the backrest 1.1. Here, the securing supports 5 protrude out of the frame 1.2 at the top and at the bottom. Here, FIG. 1A shows a closed frame 1.2. FIG. 1B shows the frame 1.2 in an open state, in order to show the securing support 5 which is provided in the frame 1.2.

In order to hold the headrest rods 3 in the securing supports 5 with low noise, in particular without rattling, and in a manner which compensates for part or manufacturing tolerances, sliding sleeves 6 (also called sliding bushes) are arranged in the said securing supports 5.

The sliding sleeves 6 are configured in each case as a single-piece insert. As an alternative, the sliding sleeve 6 can be configured in multiple pieces, in particular as an upper and lower sliding sleeve part (not shown).

The sliding sleeves 6 are manufactured, for example, from plastic. In order to cover the at least upper end of the sleeve-shaped securing supports 5, the sliding sleeves 6 have a flange section 6.1 on the end side. The upper flange section 6.1 of the respective sliding sleeve 6 is configured as an angled-away edge. In addition, the lower end of the securing support 5 can also have a flange section 6.1. Here, the angled-away flange sections 6.1 cover the upper and/or lower ends of the securing supports 5.

In the assembled state, the headrest rods 3 are guided through the sliding sleeves 6 and the securing supports 5 and are fastened to the frame 1.2.

FIGS. 1B to 1F diagrammatically show different sectional illustrations of the headrest arrangement 2 in the region of the securing support 5 with a sliding sleeve 6 for a headrest rod 3.

The sliding sleeve 6 is configured as a single-piece sleeve body 6.2 which comprises the flange section 6.1 on the end side. The sleeve body 6.2 has at least one coupling section 6.3. Here, the coupling section 6.3 is configured, for example, between the two end-side flange sections 6.1. In order to fix the sliding sleeve 6 in the securing body 5, the coupling section 6.3 comprises at least one flexible coupling face 6.4 for bearing against the securing body 5.

In one possible embodiment, the flexible coupling face 6.4 is formed by a cavity 6.5 in a wall 6.6 of the sleeve body 6.2 in the coupling section 6.3. In the exemplary embodiment, the sleeve body 6.2 has two coupling sections 6.3 which lie opposite one another in section. Here, the two coupling sections 6.3 which lie opposite one another are configured in the form of widened portions of the wall 6.6. In other words, the wall 6.6 has a greater thickness in the region of the coupling sections 6.3.

Here, one of the coupling sections 6.3 has a cavity 6.5. The cavity 6.5 is delimited to the outside by a flexible bridge wall. The other coupling section 6.3 which lies opposite is configured as a solid profile.

Moreover, the sliding sleeve 6, in particular its hollow-cylindrical sleeve body 6.2, has different reinforcements on the outer side, in particular reinforcing ribs 6.8, reinforcing webs 6.9 and/or fastening webs 6.10.

The frame 1.2 of the backrest 1.1 is configured as a hollow profile. In particular, the frame 1.2 is configured as a C-shaped hollow profile.

Figure 1C:
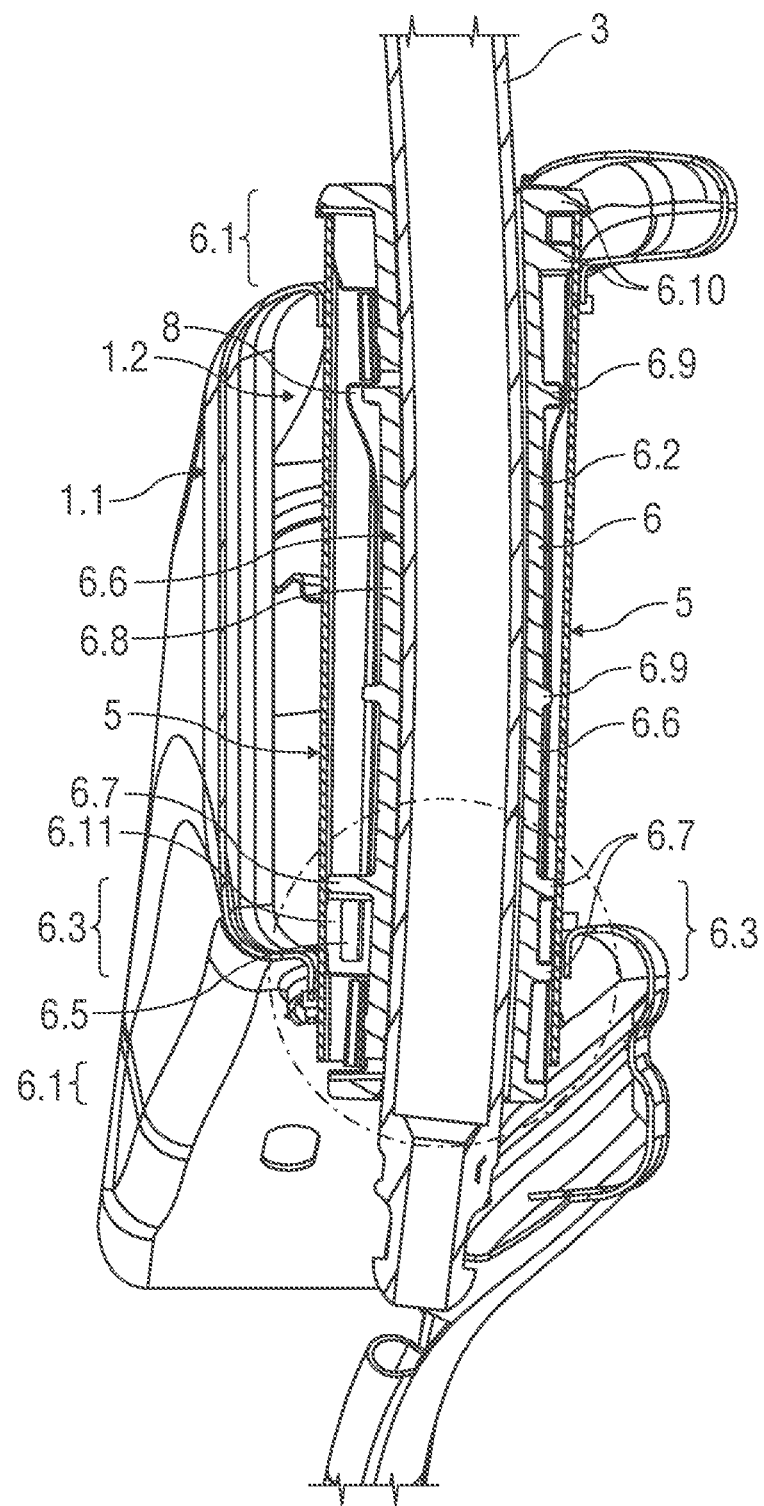
FIG. 1C is another sectional illustration diagrammatically showing the headrest arrangement in the region of a securing support having a sliding sleeve for a headrest rod.

A comparison of FIGS. 1B and 1C shows that the wall 6.6 of the sliding sleeve 6 can have varying thicknesses. Here, regions of the wall 6.6 which lie opposite one another in section can have an identical thickness or different thicknesses. The sliding sleeve 6 is held in the securing support 5 by means of a fastening means 8, for example a latching lug.

Figure 1D:
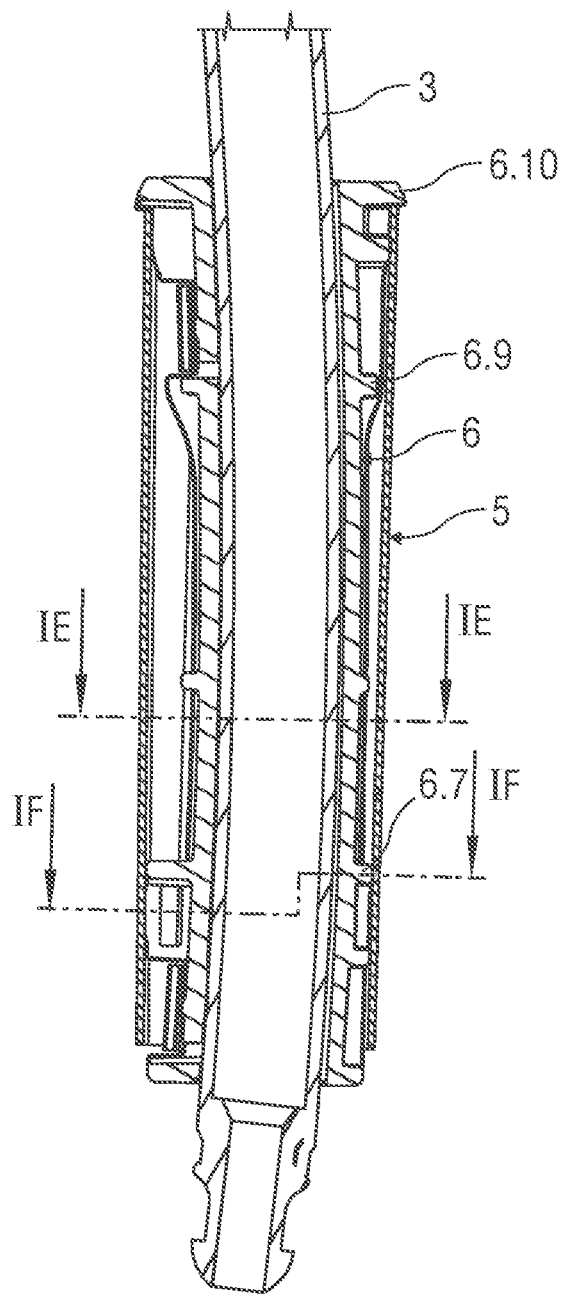
FIG. 1D is another sectional illustration diagrammatically showing the headrest arrangement in the region of a securing support having a sliding sleeve for a headrest rod.

The sliding sleeve 6, in particular its sleeve body 6.2, is not of straight configuration, but rather of curved configuration in the longitudinal extent here, as shown in FIG. 1D. Here, the curvature of the sliding sleeve 6 corresponds substantially to the curvature of the headrest rod 3.

Figure 1E:
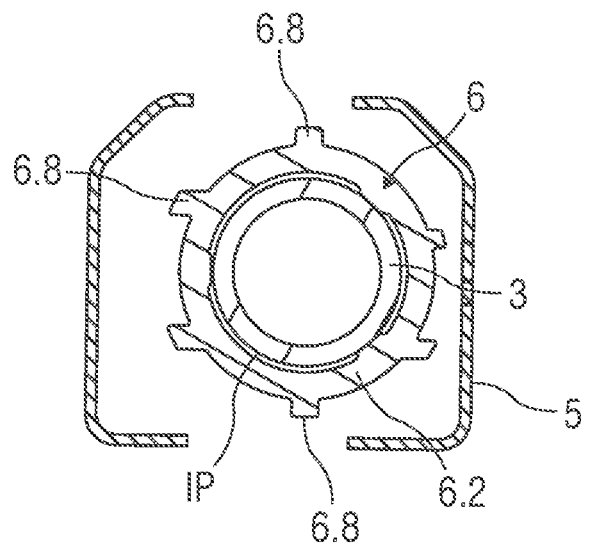
FIG. 1E is another sectional illustration diagrammatically showing the headrest arrangement in the region of a securing support having a sliding sleeve for a headrest rod.

FIG. 1E shows a cross section of the sliding sleeve 6 which is held in the securing support 5. In cross section, the securing support 5 has a polygonal, in particular rectangular, shape. As an alternative, the securing support 5 can also have another suitable cross-sectional shape, for example a round cross-sectional shape (not shown in greater detail). The securing support 5 is, for example, a metal sleeve which is fastened, in particular welded, in the frame 1.2.

As can be seen in cross section, the sliding sleeve 6 has a round cross-sectional shape, the inner profile IP being of planar configuration in FIG. 1E. On the outer side, the sleeve body 6.2 has a plurality of reinforcing ribs 6.8 distributed about the circumferential face.

Figure 1F:
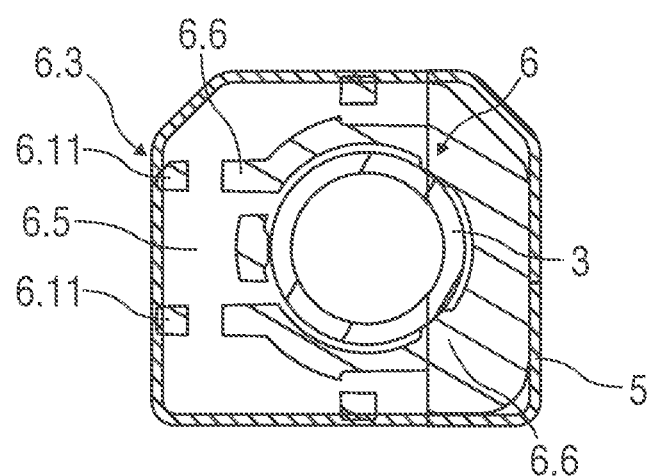
FIG. 1F is another sectional illustration diagrammatically showing the headrest arrangement in the region of a securing support having a sliding sleeve for a headrest rod.

FIG. 1F shows the sliding sleeve 6 in the region of the coupling sections 6.3 which lie opposite one another with the cavity 6.5 in the wall 6.6 on one side and the solid profile of the wall 6.6 on the opposite side in cross section.

Figure 2A:
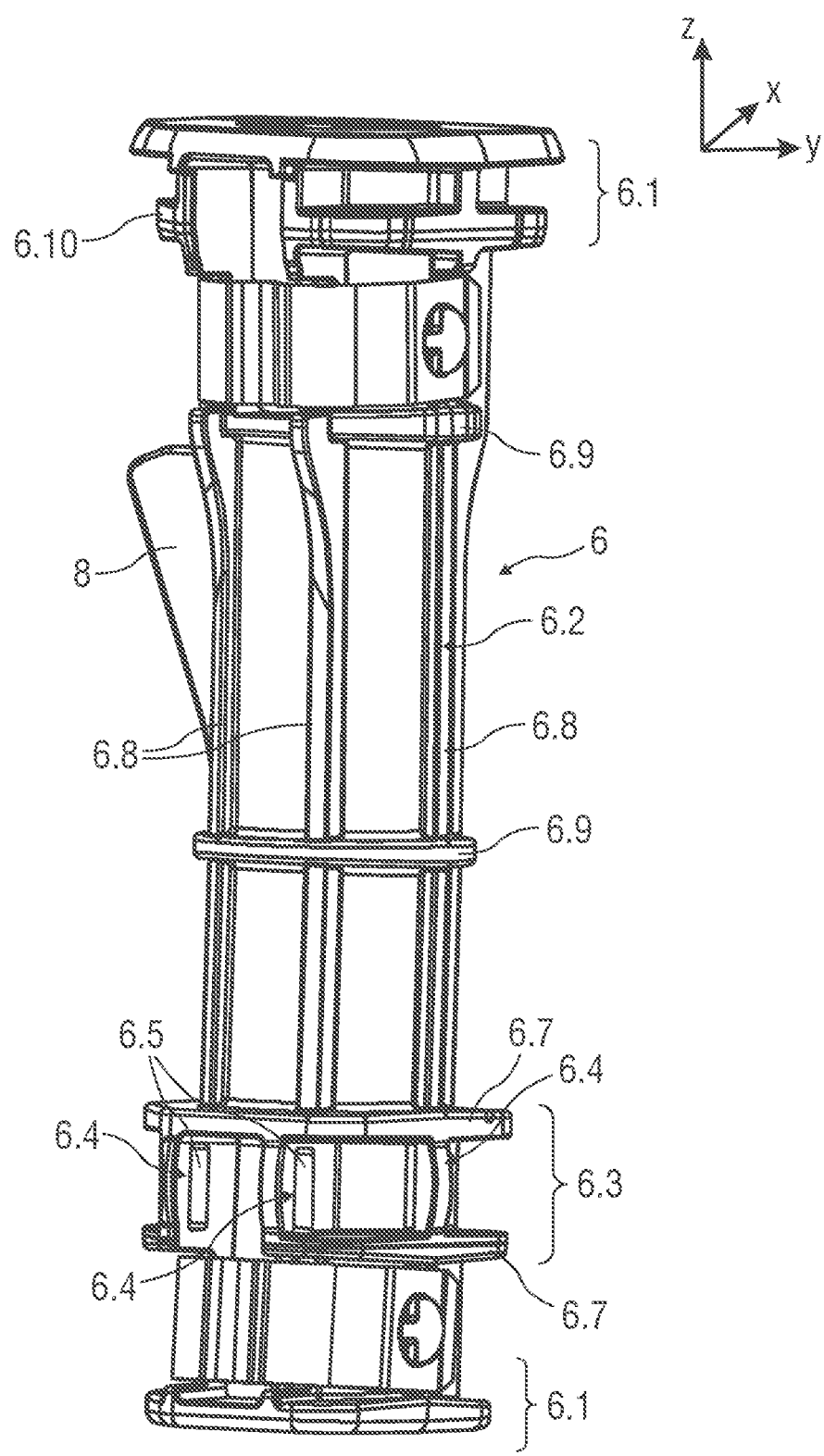
FIG. 2A is a perspective view diagrammatically showing a sliding sleeve for a headrest arrangement.

FIG. 2A shows a single sliding sleeve 6 in detail. The sliding sleeve 6 is configured as a single-piece sleeve body 6.2 which comprises the flange section 6.1 on the end side. The sleeve body 6.2 has at least one coupling section 6.3. Here, the coupling section 6.3 is configured, for example, between the two end-side flange sections 6.1. In order to fix the sliding sleeve 6 in the securing body 5, the coupling section 6.3 comprises the at least one flexible coupling face 6.4 for bearing against the securing body 5.

For compensation of manufacturing and part tolerances, the coupling section 6.3 has a plurality of flexible coupling faces 6.4, as shown in FIG. 2A. Here, the flexible coupling faces 6.4 are arranged such that they are distributed, in particular symmetrically, about the circumference of the sleeve body 6.2. For example, a plurality of individual coupling faces 6.4 in the form of flexible longitudinal webs with cavities 6.5 can be configured such that they are distributed about the circumference of the sleeve body 6.2. As an alternative, the coupling face 6.4 can be of circumferential configuration, a plurality of cavities 6.5 then being made in the wall 6.6 such that they are distributed about the circumference of the sleeve body 6.2. In a further alternative, a single cavity 6.5 can be of radially circumferential configuration (not shown in greater detail).

Figure 3:
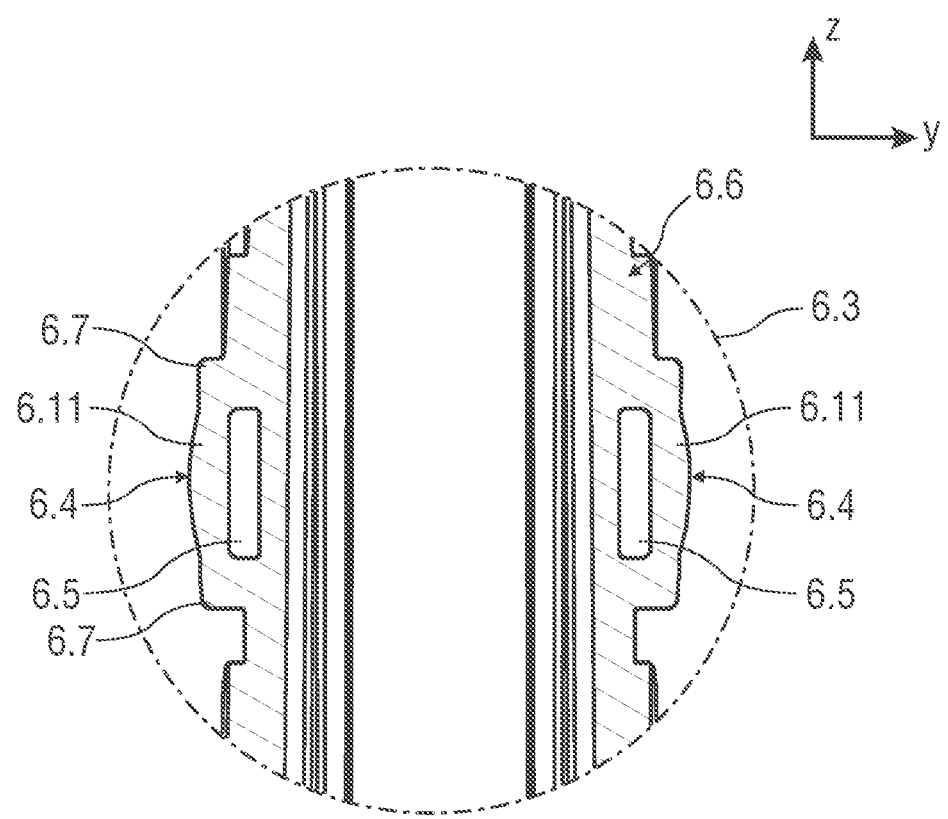
FIG. 3 is an enlarged sectional illustration diagrammatically showing a sliding sleeve in the region of a coupling section, in the non-installed state.

In one possible embodiment, the respective flexible coupling face 6.4 is formed by a cavity 6.5 in a wall 6.6 of the sleeve body 6.2 in the coupling section 6.3, as FIG. 3 shows in an enlarged illustration of the coupling section 6.3.

The wall 6.6 of the sleeve body 6.2 is of widened configuration in the coupling section 6.3 and is therefore of thicker configuration than in the remaining region of the sleeve body 6.2.

Moreover, the coupling section 6.3 is delimited by upper and lower circumferential webs 6.7. In addition, the sleeve body 6.2 can be provided with reinforcing ribs 6.8 and/or circumferential reinforcing webs 6.9.

A circumferential fastening web 6.10 is arranged below the upper flange section 6.1 which points in the direction of the headrest body 4 and is configured as an angled-away cover and edge. For example, a seat cover which is not shown in greater detail for the backrest 1.1 is fastened, in particular clamped, between the angled-away upper flange section 6.1 and the circumferential fastening web 6.10 in the assembled state.

Figure 2B:
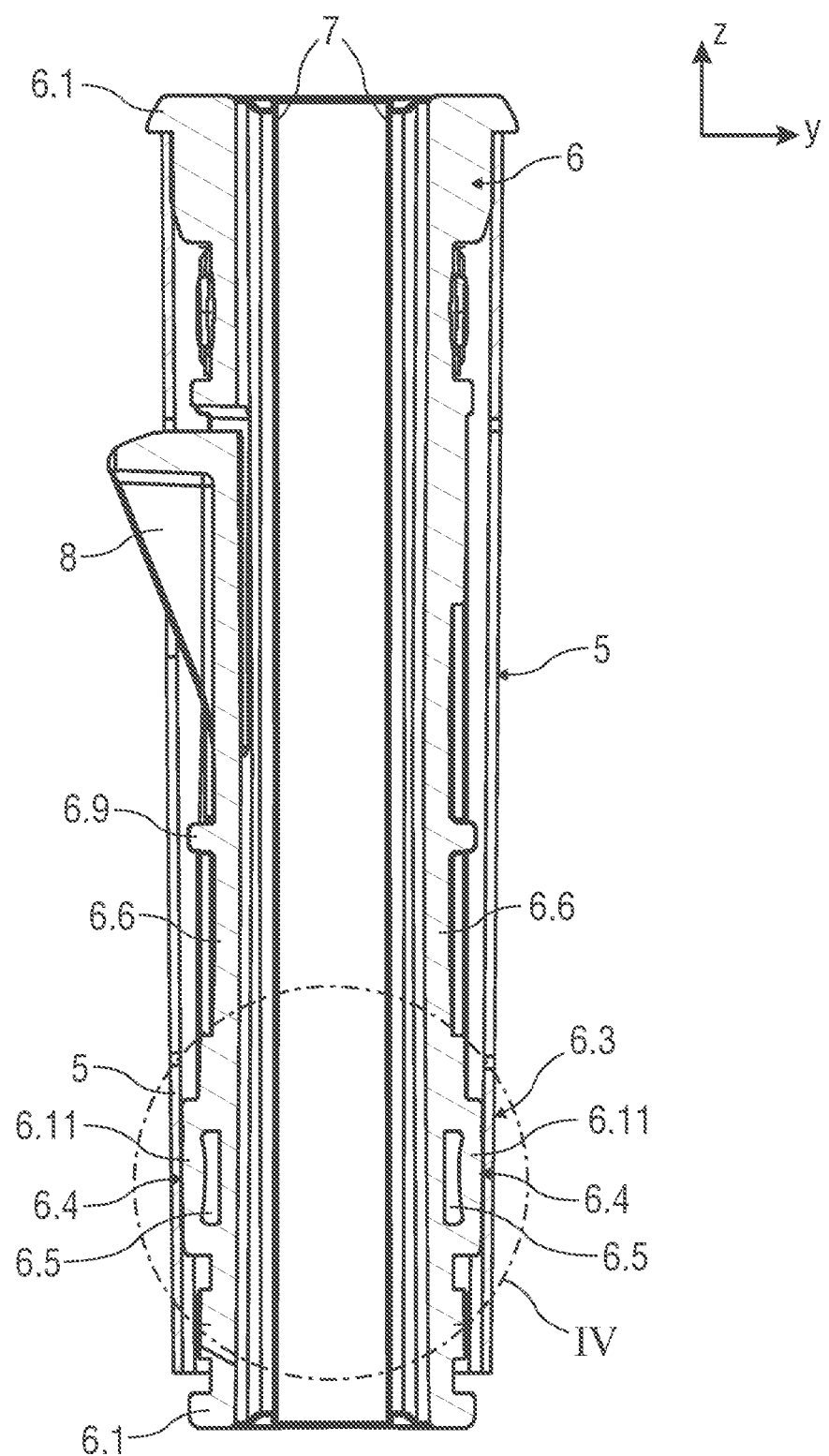
FIG. 2B is a sectional diagrammatically showing a sliding sleeve which is arranged and held in a securing support.

FIG. 2B shows a diagrammatic sectional illustration of the sliding sleeve 6 in the installed state and an enlarged sectional illustration of the installed sliding sleeve 6 in the region of the coupling section 6.3.

In the installed state, the sliding sleeve 6 is arranged in the securing support 5 and is held in the region of the coupling section 6.3 in a manner which is clamped in the said securing support 5. Here, the flexible coupling face 6.4 is pressed onto the inner wall of the securing support 5. In particular, the flexible bridge wall 6.11 is pressed into the cavity 6.5 and is changed into a stressed state. As a result, despite manufacturing tolerances, the sliding sleeve 6 is held, in particular clamped or pressed, in the securing support 5 securely and fixedly and, in particular, without rattles.

As shown in FIG. 2B, the sliding sleeve 6 is arranged in the securing support 5 and is held in a clamping manner. One of the headrest rods 3 can then be guided into the sliding sleeve 6 and held, as shown in FIG. 1. Here, the coupling section 6.3 with the coupling faces 6.4 is configured in the lower region of the sliding sleeve 6, in particular in the case of a single-piece form of the sliding sleeve 6. In addition, a coupling section 6.3 can also be configured in the upper and/or middle region of the sliding sleeve 6 (not shown). In the case of a multiple-piece configuration of the sliding sleeve 6, each part comprises at least one coupling section 6.3.

FIG. 3 diagrammatically shows an enlarged sectional illustration of the sliding sleeve 6 in the region of the coupling section 6.3 in the non-installed state.

Here, the cavity 6.5 is covered to the outside by a flexible bridge wall 6.11. Here, the cavity 6.5 extends in the longitudinal direction of the sliding sleeve 6.

Moreover, the flexible bridge wall 6.11 can be of outwardly curved configuration in the non-installed state. In the non-installed state, the flexible bridge wall 6.11 is in the relieved state.

The widening of the wall 6.6 in the coupling section 6.3 can take place in a stepped manner, for example, as shown.

The inner side of the sliding sleeve 6 is of straight and planar configuration. As a result, the headrest rods 3 are guided securely and simply.

Figure 4:
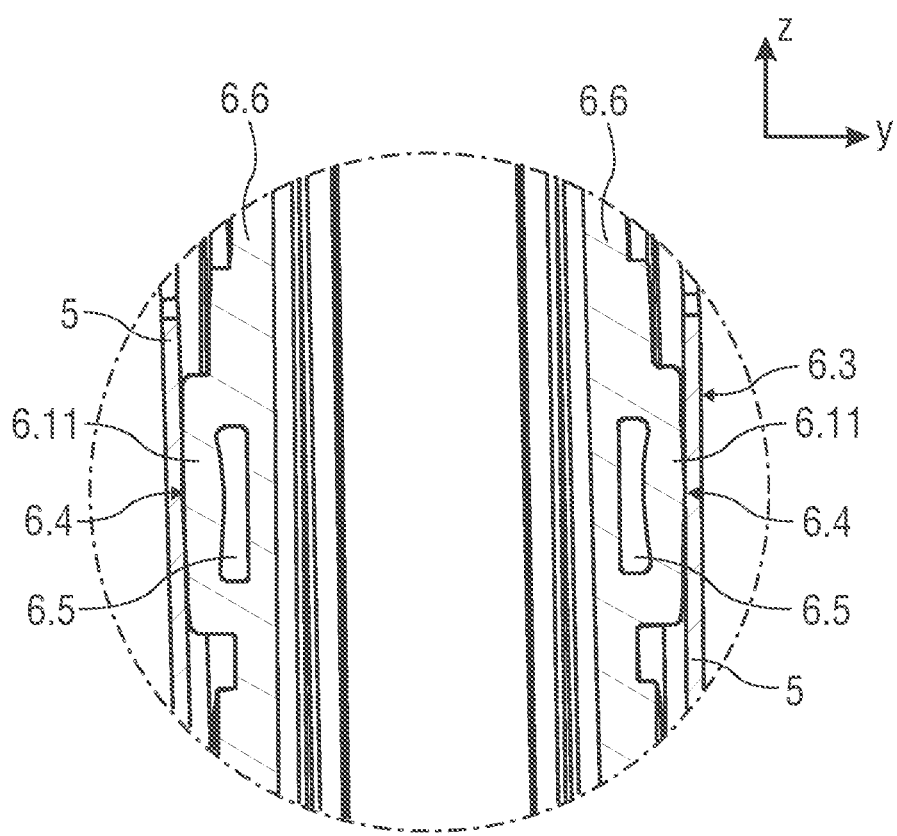
FIG. 4 is an enlarged sectional illustration diagrammatically showing a sliding sleeve in the region of a coupling section, in the installed state.

FIG. 4 shows a diagrammatic sectional illustration of the sliding sleeve 6 in the installed state and an enlarged sectional illustration of the installed sliding sleeve 6 in the region of the coupling section 6.3.

In the installed state, the sliding sleeve 6 is arranged in the securing support 5 and is held in a clamping manner in the latter in the region of the coupling section 6.3. Here, the flexible coupling face 6.4 is pressed onto the inner wall of the securing support 5. In particular, the flexible bridge wall 6.11 is pressed into the cavity 6.5 and is changed into a stressed state. As a result, despite manufacturing tolerances, the sliding sleeve 6 is held, in particular clamped or pressed, in the securing support 5 securely and fixedly and, in particular, without rattles.

Figure 5A:
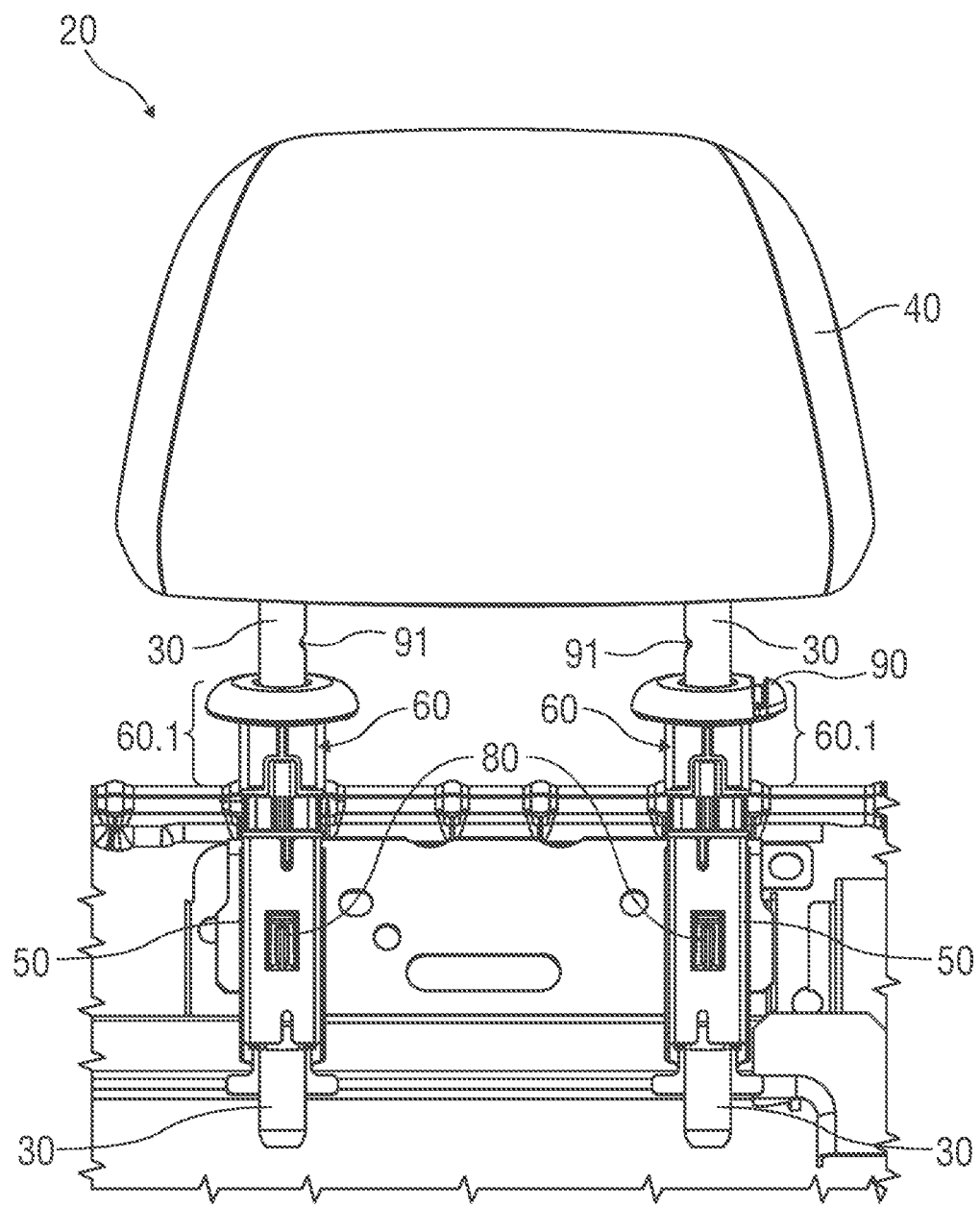
FIG. 5A is an enlarged illustration diagrammatically showing a cut-open frame of a headrest arrangement in a region of a securing support having a sliding sleeve according to a second exemplary embodiment.

FIG. 5A shows a second exemplary embodiment for a sliding sleeve 60. In comparison with the first exemplary embodiment, the sliding sleeve 60 has an actuating means 90 for a height adjusting means in the flange section 60.1. The ends of the headrest rods 30 are provided with latching receptacles 91 for fixing the headrest arrangement 20 at a set height.

Here, FIG. 5A diagrammatically shows an enlarged illustration of a sectional image of the frame 10.2 with the securing support 50 which is fastened to the frame 10.2, and the two sliding sleeves 60 which are arranged therein for the two headrest rods 30.

The headrest rods 30 can be of separate configuration or can be two ends of a U-shaped headrest bracket.

Figure 5B:
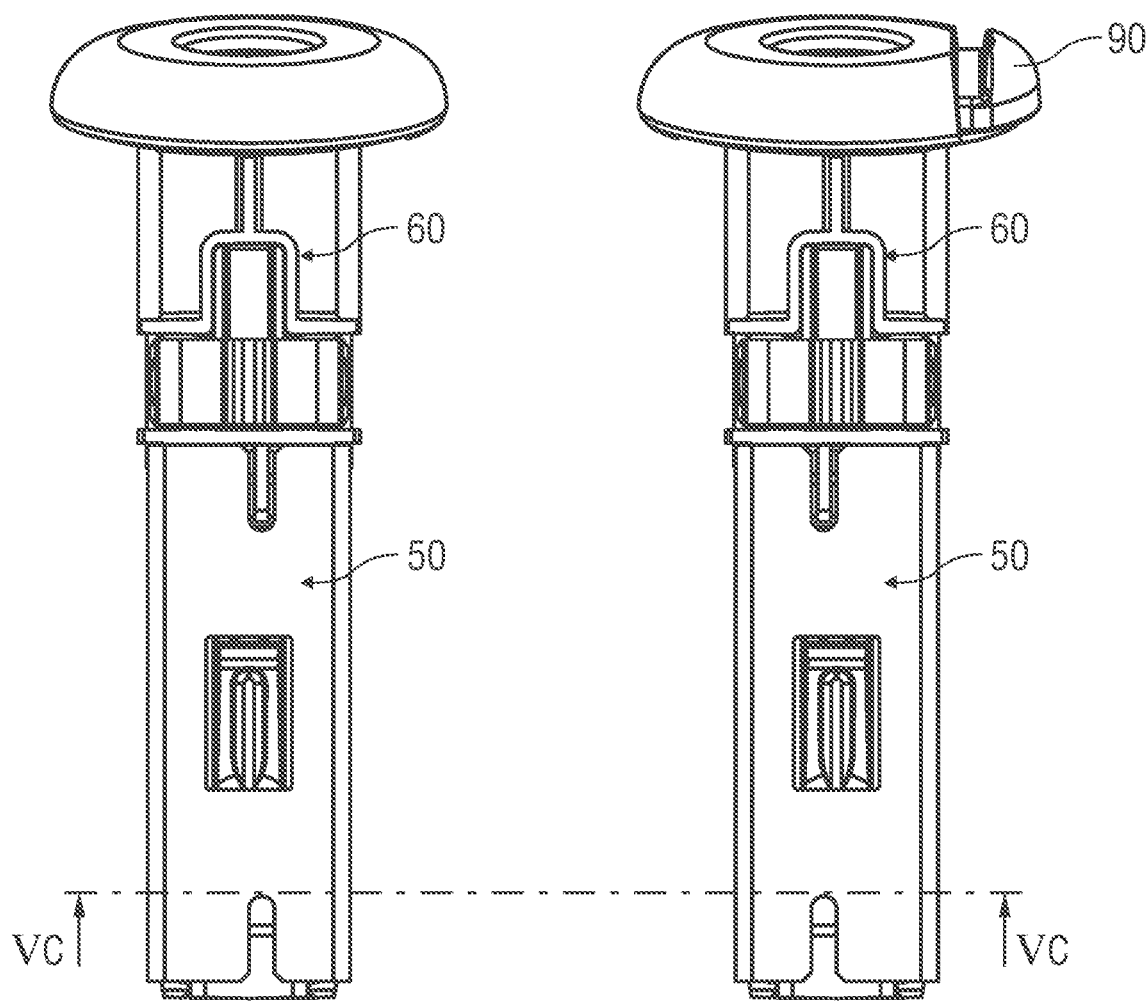
FIG. 5B is perspective views diagrammatically showing a sliding sleeve in the securing support.
Figure 5C:
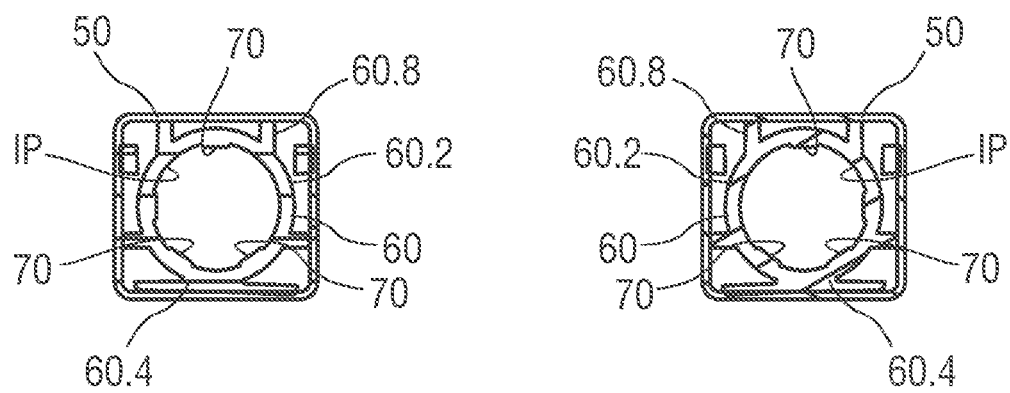
FIG. 5C is a sectional image diagrammatically showing a sliding sleeve in the securing support.

FIG. 5B shows a side view of two sliding sleeves 60 which are arranged in the respective securing support 50. FIG. 5C shows a sectional image of FIG. 5B.

In this exemplary embodiment, the inner profile IP of the cylindrical sliding sleeve 60 is of non-planar configuration. Distributed around the inner circumference, the sliding sleeve 60 has sliding elements 70 which serve to guide the headrest rods 30.

FIGS. 6A, 6B, 6C and 7 show a further exemplary embodiment of a sliding sleeve 60 in detail. The sliding sleeve 60 is configured as a single-piece sleeve body 60.2 which comprises a flange section 60.1 at least at the upper end. Below the flange section 60.1, the sleeve body 60.2 has at least one coupling section 60.3. As an alternative, the coupling section 60.3 can also have only one flexible coupling face 60.4.

In the longitudinal direction, the coupling section 60.3 comprises a plurality of flexible coupling faces 60.4 for compensating for manufacturing and part tolerances and for reducing rattling noise. Here, the flexible coupling faces 60.4 are formed in the wall of the sliding sleeve 60, in particular symmetrically in the longitudinal direction (=in the direction of the longest extent of the sliding sleeve 60).

In particular, the flexible coupling faces 60.4 form an outer surface structure. For example, the flexible coupling faces 60.4 are formed as transverse bulges or transverse structures. Depending on the shape and size of the transverse bulges or transverse structures, the outer surface structure can have an undulating form.

Here, the coupling section 60.3 can be, in particular, of flat configuration, in particular of strip-shaped or rectangular configuration. The coupling section 60.3 extends, for example, in the longitudinal direction over a length which is greater than the length in the transverse direction. As an alternative, the coupling section 60.3 can be of dimpled configuration.

In one possible embodiment, the respective flexible coupling face 60.4 is formed by a cavity in a wall 60.6 of the sleeve body 60.2 in the coupling section 60.3. As an alternative, the flexible coupling face 60.4 can be configured by a corresponding material thickness and a corresponding flexible material of the wall 60.6 as outer surface or transverse structure, as shown in FIGS. 6A to 8.

In an analogous manner to the preceding exemplary embodiment, the coupling section 60.3 can be delimited by at least one circumferential web 60.7. In addition, the sleeve body 60.2 can be provided with reinforcing ribs 60.8 and/or circumferential reinforcing webs 60.9.

A circumferential fastening web 60.10 is arranged below the upper flange section 60.1 which points in the direction of the headrest body 4 and is configured as an angled-away cover and edge. A seat cover (not shown in greater detail) for the backrest 1.1 is fastened, in particular clamped, for example, in the assembled state between the angled-away upper flange section 60.1 and the circumferential fastening web 60.10.

Figure 8:
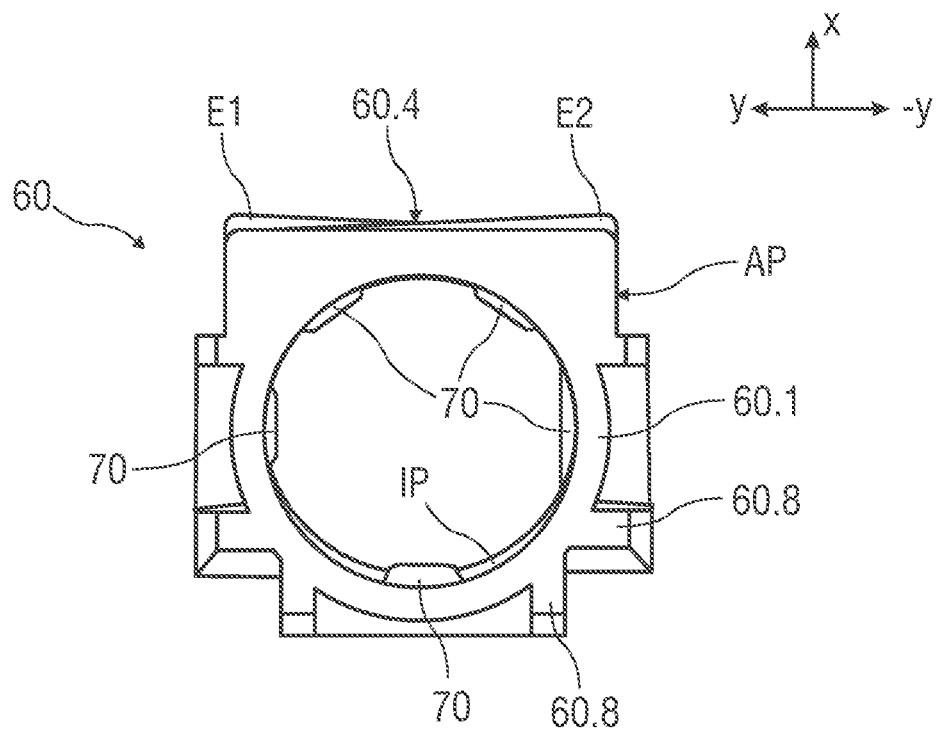
FIG. 8 is a sectional illustration diagrammatically showing a sliding sleeve with outer-side surface structures.

Moreover, the sliding sleeve 60 is held in the securing support 50 in a positively locking and/or non-positive manner by means of a fastening means 80, in particular a latching lug. To this end, the securing support 50 has a corresponding latching receptacle 50.1, as shown in FIG. 8.

Figure 6A:
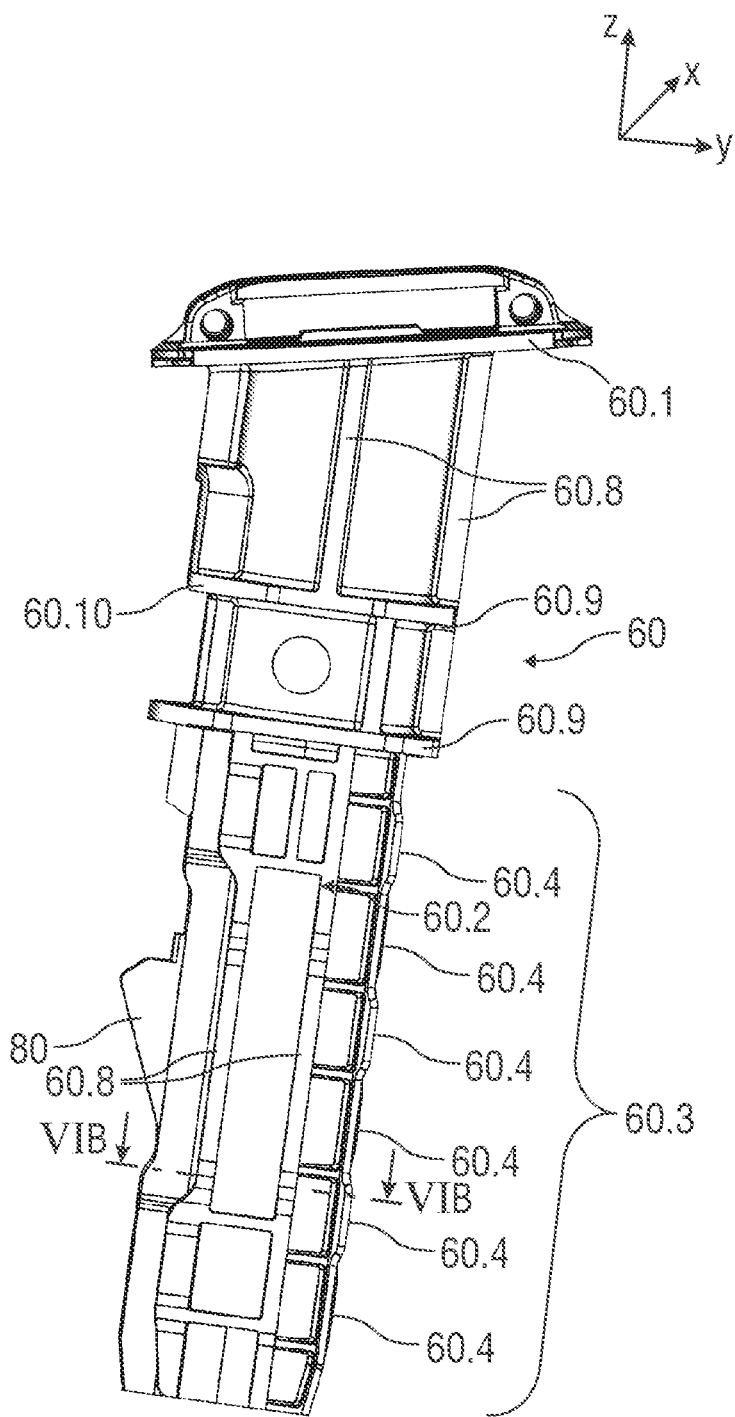
FIG. 6A is a side view diagrammatically showing the second exemplary embodiment of a sliding sleeve for a headrest arrangement.
Figure 6B:
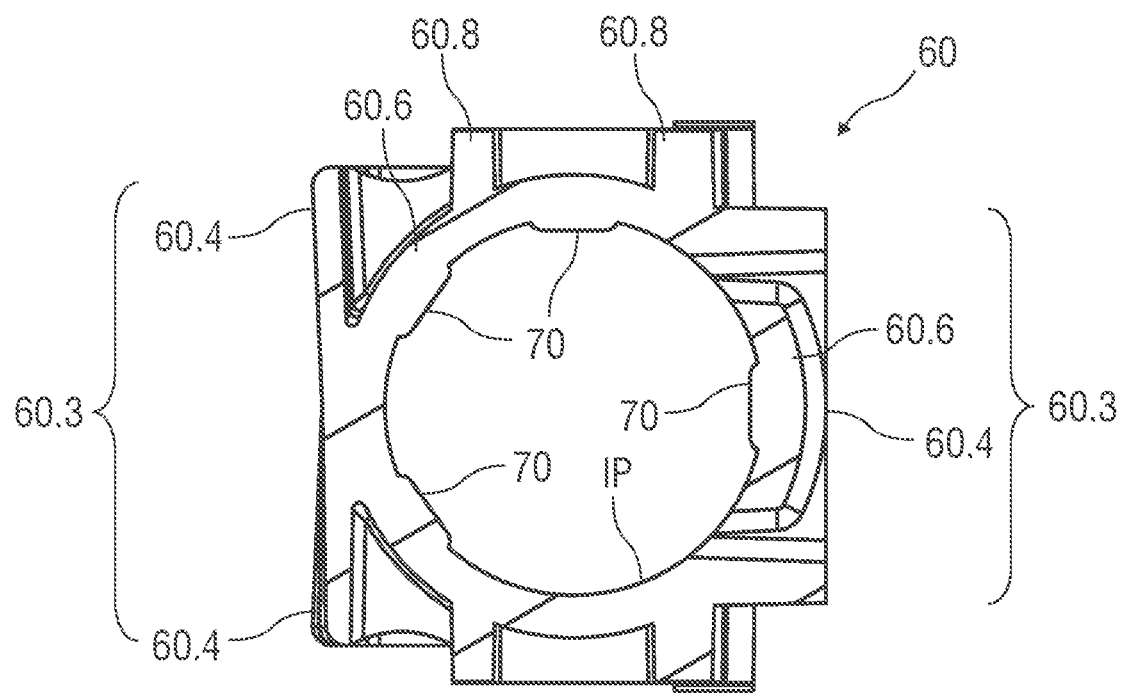
FIG. 6B is a sectional view diagrammatically showing the second exemplary embodiment of a sliding sleeve for a headrest arrangement.
Figure 6C:
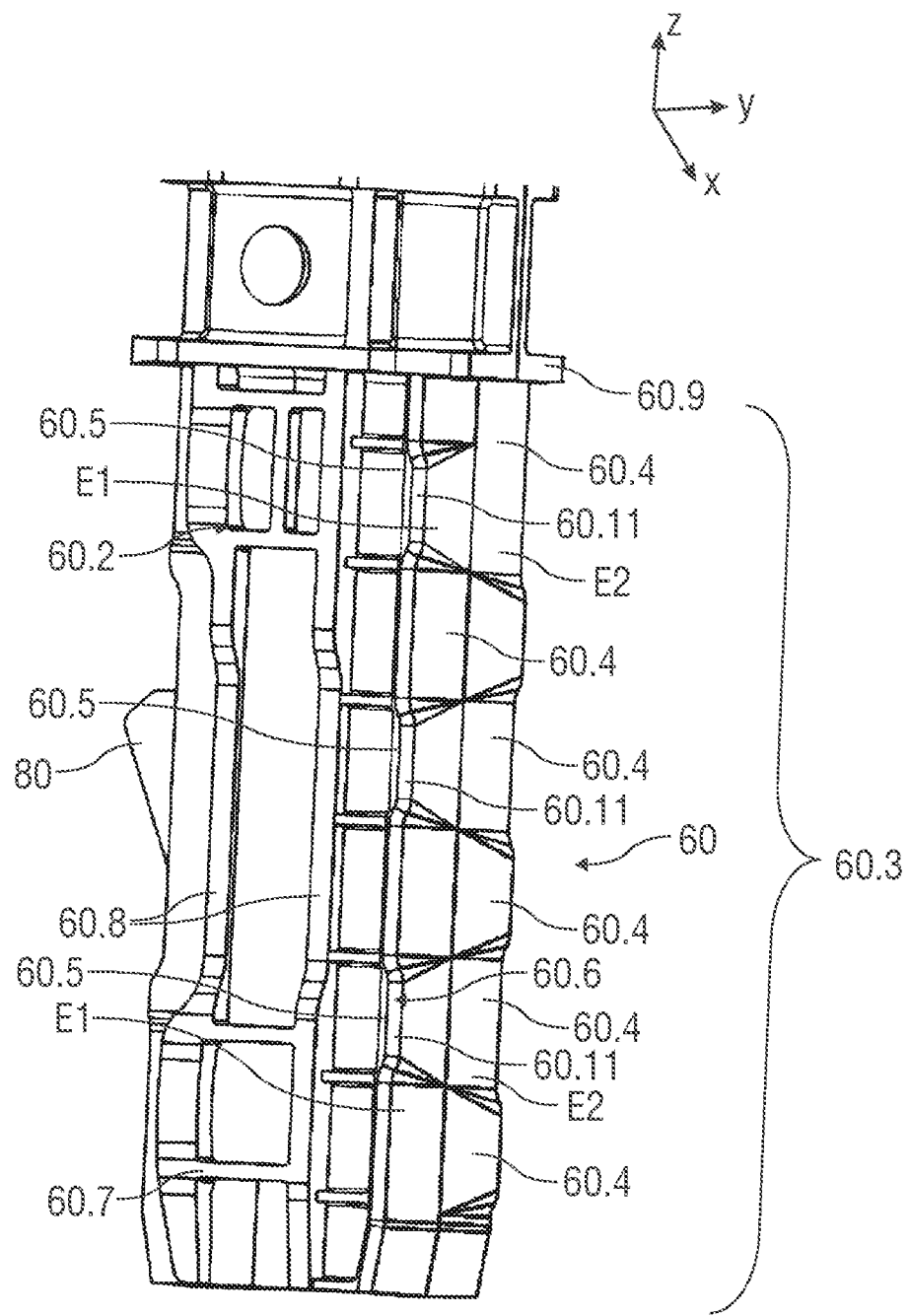
FIG. 6C is a partial view diagrammatically showing the second exemplary embodiment of a sliding sleeve for a headrest arrangement.

FIG. 6B diagrammatically shows a sectional illustration of the sliding sleeve 60 in the region of the coupling section 60.3 in the non-installed state. FIG. 6C diagrammatically shows a perspective illustration of the sliding sleeve 60 in the non-installed state.

Here, the respective flexible coupling face 60.4 is formed by a bulge or protuberance, in particular a transverse bulge or transverse structure.

Moreover, the respective flexible coupling face 60.4 can be of outwardly curved configuration in the non-installed state. In the non-installed state, the flexible coupling face 60.4 is in the relieved state.

Manufacturing tolerances between the sliding sleeve 60 and the securing support 50 can be compensated for and rattling can be reduced by way of a flexibly configured coupling section 60.3 of this type. In addition, an improved press fit of the sliding sleeve 60 in the securing support 50 is made possible.

In one development, the transverse bulges can be configured as bridge walls 60.11 which cover a cavity 60.5 in the wall 60.6 of the coupling section 60.3. As an alternative, the transverse bulges or transverse structures can be formed from a flexible material which is formed as a surface structure on the outer side on the wall of the coupling section 60.3.

The flexible coupling faces 60.4 are configured next to one another and/or above one another in the longitudinal direction. Here, the flexible coupling faces 60.4 can be of trapezoidal configuration in plan view. As an alternative, the flexible coupling faces 60.4 can be of oval or cam-shaped configuration (not shown).

Figure 7:
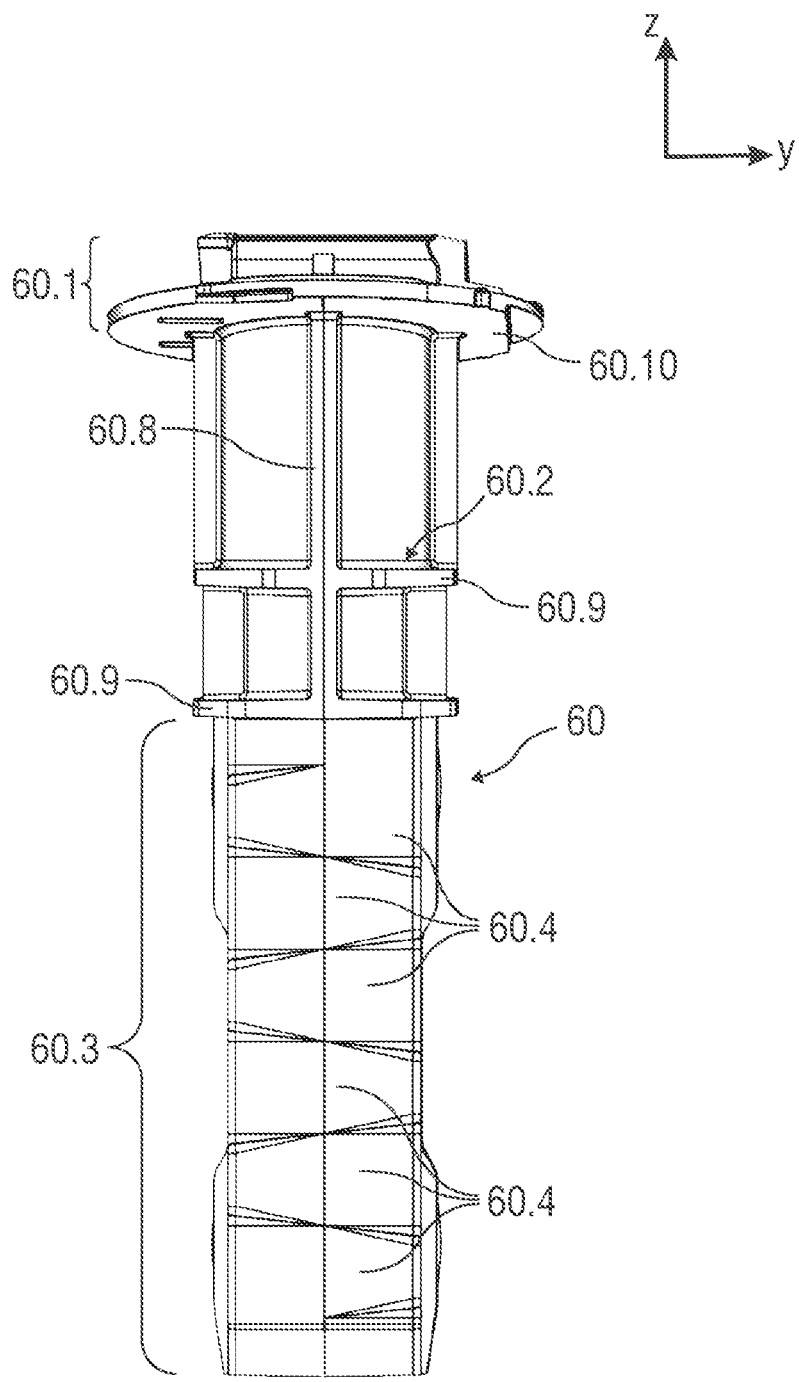
FIG. 7 is a plan view diagrammatically showing a coupling face of the second exemplary embodiment of a sliding sleeve for a headrest arrangement.

In addition, the surface of the respective flexible coupling face 60.4 can be of beveled configuration in the transverse direction, with the result that one end E1 of the flexible coupling face 60.4 is formed in the wall 60.6 at a higher level and the opposite end E2 is formed in the wall 60.6 at a lower level, as shown in FIGS. 6C, 7 and 8.

In one development, the flexible coupling faces 60.4 which are arranged next to one another and/or above one another and/or radially circumferentially can be configured in such a way that they are stepped with respect to one another in the longitudinal direction of the sliding sleeve 60. Here, the flexible coupling faces 60.4 can be formed alternately at a high level and low level in the coupling section 60.3 in the longitudinal direction and/or in the transverse direction and/or radially circumferentially. Manufacturing and part tolerances between the sliding sleeve 60 and the securing support 50 can be compensated for by way of a flexibly configured coupling section 60.3 of this type.

The sliding sleeve 60 is configured substantially as a hollow profile, in particular a hollow cylinder. Here, the inner profile IP can be of substantially round configuration in cross section, and an outer profile AP can be of polygonal, in particular rectangular, configuration, as shown in FIG. 8. The inner side and therefore the inner profile IP of the sliding sleeve 6 is of substantially straight and planar configuration in the exemplary embodiment according to FIG. 5B. The inner profile IP of the sliding sleeve 60 of the exemplary embodiment according to FIG. 8 can be provided in regions along the inner circumference with sliding elements 70, in particular elevations, which are, for example, distributed symmetrically. As a result, the headrest rods 3 are guided securely and simply.

As shown clearly and unambiguously in cross section in FIG. 8, the sliding sleeve 60 has the flexible coupling faces 60.4 which are stepped or beveled differently in an alternating manner on the outer side in the coupling section 60.3. To this end, the flexible coupling faces 60.4 are configured as transverse bulges or transverse structures which are beveled in the transverse direction, which results in a higher surface structure at one end E1 of a respective coupling face 60.4 than at the opposite end E2 of the same flexible coupling face 60.4. Alternating beveling of the flexible coupling faces 60.4 in opposite transverse directions Y, –Y results in a surface profile/structure in the form of a seesaw pattern.

Figure 9:
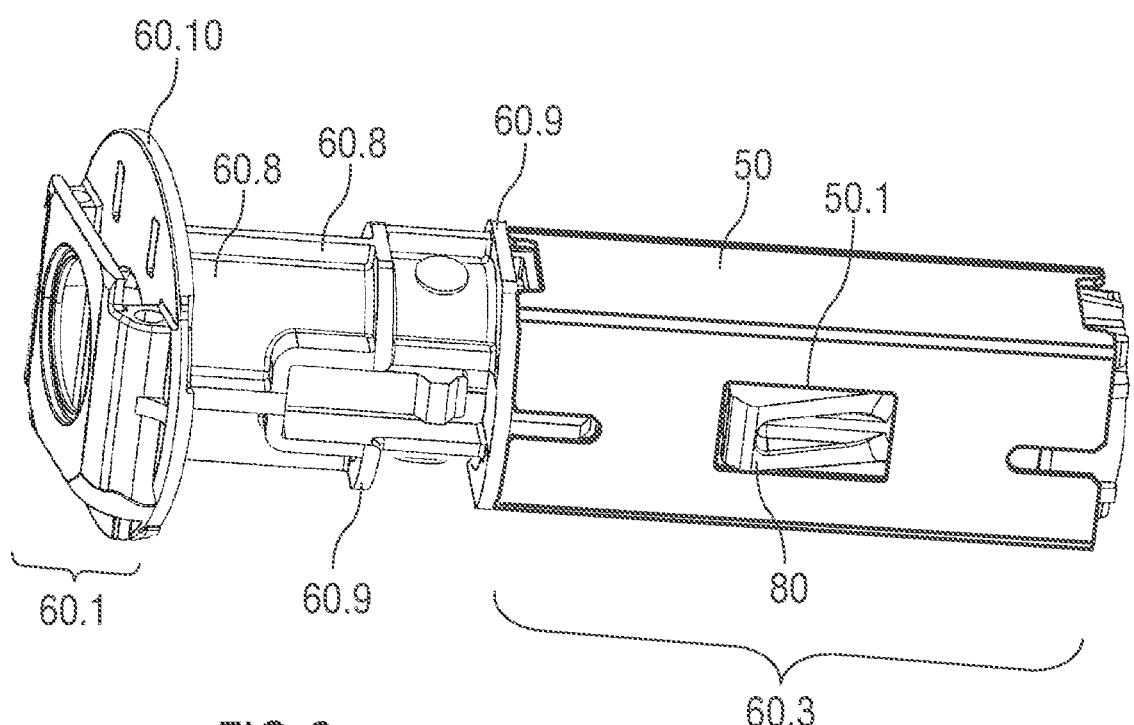
FIG. 9 is a perspective illustration diagrammatically showing a sliding sleeve which is arranged in a securing support.

FIG. 8 shows a diagrammatic illustration of the sliding sleeve 60 in a plan view from below of the coupling section 60.3 with the flexible coupling faces 60.4. FIG. 9 shows a diagrammatic illustration of an enlarged illustration of the sliding sleeve 60 which is installed in the securing support 50 in the region of the coupling section 60.3.

In the installed state, the sliding sleeve 60 is arranged in the securing support 50 and is held such that it is clamped in the latter in the region of the coupling section 60.3. Here, the flexible coupling faces 60.4 are pressed onto the inner wall of the securing support 50. In particular, in the case of a configuration of the respective flexible coupling face 60.4 as a flexible bridge wall, it is pressed into the cavity and is changed into a stressed state. As a result, despite manufacturing tolerances, the sliding sleeve 60 is held, in particular clamped or pressed, in the securing support 50 securely and fixedly and, in particular, without rattles.

In addition, the sliding sleeve 60 is held in the securing support 5 in a positively locking and/or non-positive manner by means of the fastening means 80, for example a latching hook. To this end, the securing support 50 has a corresponding latching receptacle 50.1, into which the fastening means 80 engages in a releasably latching manner.

In an analogous manner to the exemplary embodiment according to FIG. 1, the sliding sleeve 60 is arranged and held in a clamping manner in the securing support 50. One of the headrest rods 3 can then be guided into the sliding sleeve 60 and held, as shown in FIG. 1. Here, the coupling section 60.3 with the coupling faces 60.4 is configured in the lower region of the sliding sleeve 60, in particular in the case of a single-piece form of the sliding sleeve 60. In addition, a coupling section 60.3 can also be configured in the upper and/or middle region of the sliding sleeve 60 (not shown). In the case of a multiple-piece configuration of the sliding sleeve 60, each part comprises at least one coupling section 60.3.

It is possible in another embodiment (not shown) that the flexible coupling faces 60.4 are configured symmetrically and/or as rectangles or trapezoids.

Figure 10:
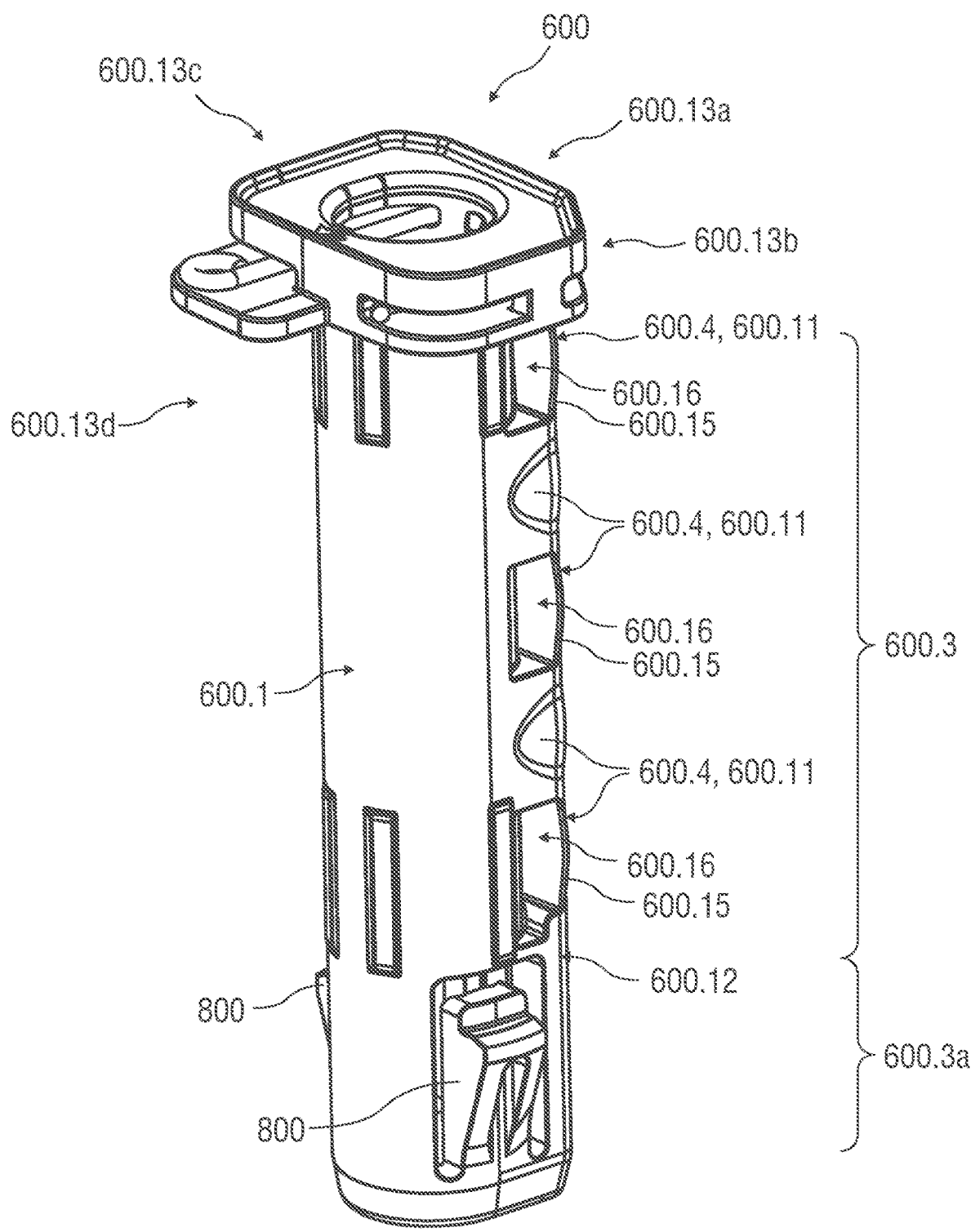
FIG. 10 is schematically a perspective view of an embodiment of a sliding sleeve with convex-shaped flexible coupling faces.

FIG. 10 shows schematically a perspective view of another embodiment of a sliding sleeve 600 with convex-shaped flexible coupling faces 600.4.

The sliding sleeve 600 is configured to secure in securing body 5 or 50.

The sliding sleeve 600 comprises a sleeve body 600.1 with a coupling section 600.3 with at least two flexible coupling faces 600.4 for bearing against the securing body 5 or 50.

The at least two flexible coupling faces 600.4 are configured to be arranged in a consecutive manner in a longitudinal direction, wherein an outer surface 600.11 of each of the flexible coupling faces 600.4 has a convex shape.

In particular, the outer surface 600.11 of each of the flexible coupling faces 600.4 is dome-shaped, e.g. half-dome-shaped.

In a further embodiment, the outer surface 600.11 of each of the flexible coupling faces 600.4 is convex in a non-installed state, so that in an installed state the convex outer surface 600.11 is compressed and is changed into a stressed state.

According to another aspect, the sleeve body 600.1 comprises at least one longitudinal edge 600.12 wherein the at least two flexible coupling faces 600.4 are alternately arranged at least 90° or 180° to each other along the at least one longitudinal edge 600.12.

Furthermore, the sliding sleeve 600.1 is at least partially oval or ring-shaped in cross-section and comprises at least one longitudinal edge 600.12. Alternatively, the sliding sleeve 600.1 is one of square, partially oval-shaped with at least one corner, partially ring-shaped with at least one corner or rectangular in cross-section and comprises at least two outer sleeve sides 600.13a and 600.13b or 600.13b and 600.13c next to one another wherein the at least two flexible coupling faces 600.4 are arranged on outer sleeve sides 600.13a, 600.13b or 600.13b, 600.13c arranged next to one another.

In another possible embodiment, the sliding sleeve 600.1 is at least one of square, partially oval-shaped with at least one corner 600.14, partially ring-shaped with at least one corner 600.14 or rectangular in cross-section and comprises outer sleeve sides 600.13a and 600.13d or 600.13b and 600.13c opposite to one another wherein the at least two flexible coupling faces 600.4 are arranged on outer sleeve sides 600.13a and 600.13d or 600.13b and 600.13c arranged opposite to one another.

Additionally, at least one of the flexible coupling faces 600.4 may comprise, in the coupling section 600.3, a wall portion with a fully enclosed cavity 600.5 within the wall portion 600.6, wherein the least one fully enclosed cavity 600.5 is covered to an outside by the convex outer surface 600.11. The cavity 600.5 may be of circumferential configuration. In particular, the cavity 600.5 extends in a longitudinal direction of the sleeve body 600.1. Furthermore, a length of the cavity 600.5 in the longitudinal direction is greater than the depth of the cavity 600.5 in the wall portion 600.6.

According to another aspect the sliding sleeve 600.1 for fixing in a securing body 5 or 50 comprises a sleeve body 600.1 with a coupling section 600.3 with at least one flexible coupling face 600.4 for bearing against the securing support or body 5 or 50, wherein the sleeve body 600.1 comprises a cross-section comprising a circular sector 600.13*d* and at least one corner 600.14, so that the sleeve body 600.1 has a longitudinal edge 600.12, wherein the flexible coupling face 600.4 comprises at least two flexible coupling faces arranged in a consecutive manner along the edge 600.12 and alternating between one sleeve side 600.13*a* of the edge 600.12 and the other sleeve side 600.13*b* of the edge 600.12.

According to a further aspect, at least one of the flexible coupling faces 600.4 comprises, in the coupling section 600.3, a wall portion 600.15 having an opening 600.16 which is only accessible from at least one of the sleeve sides 600.13*a* or 600.13*b* of the edge 600.12, wherein the opening 600.16 is covered to an outside by a convex outer surface 600.11 of at least one of the flexible coupling faces 600.4.

The coupling section 600.3 comprises a retaining portion 600.3*a*. The retaining portion 600.3*a* comprises fastener 800, e.g. latching hooks, locking tongues, detents, to secure and fix the sliding sleeve 600 in the securing support 5 or 50 in axial and radial position.

The sliding sleeve 600 comprises three sleeve sides 600.13*a* to 600.13*b* comprising the alternating flexible coupling faces 600.4 having convex outer surfaces 600.11. The sliding sleeve 600 with three sleeve sides 600.13*a* to 600.13*c* allows arranging and holding it in the securing support 5 or 50 in a clamped or pressed manner without rattles.

In particular, the flexible coupling faces 600.4 may be configured symmetrically and/or half-dome-shaped.

FIGS. 11 to 14 show schematically different side views of the embodiment of the sliding sleeve 600 according to FIG. 10.

Figure 11:
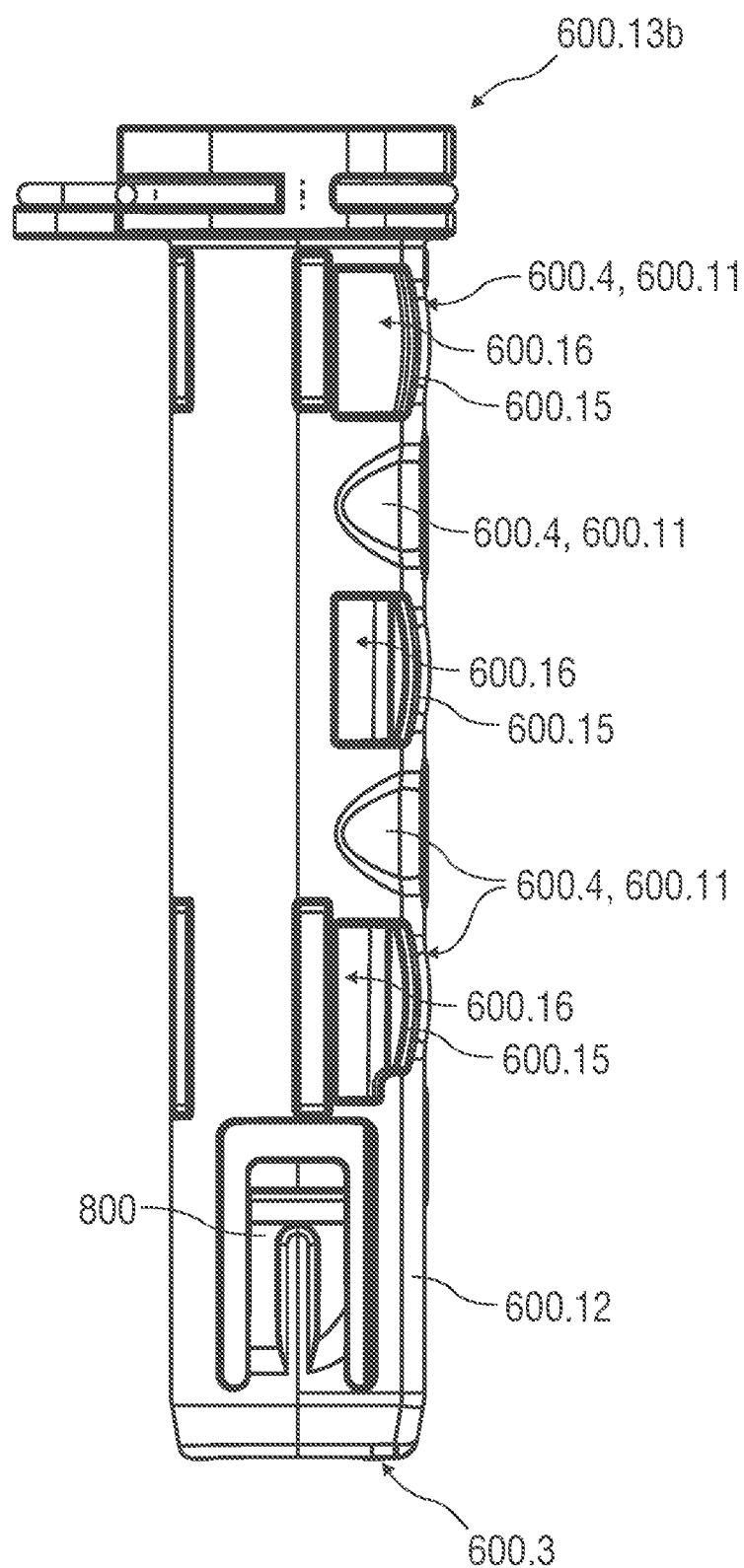
FIGS. 11 to 14 are schematically different side views of the embodiment according to FIG. 10.

FIG. 11 shows the sleeve side 600.13*b* as one of the sleeve sides along one of the longitudinal edges 600.12 and with one coupling section 600.3.

Figure 12:
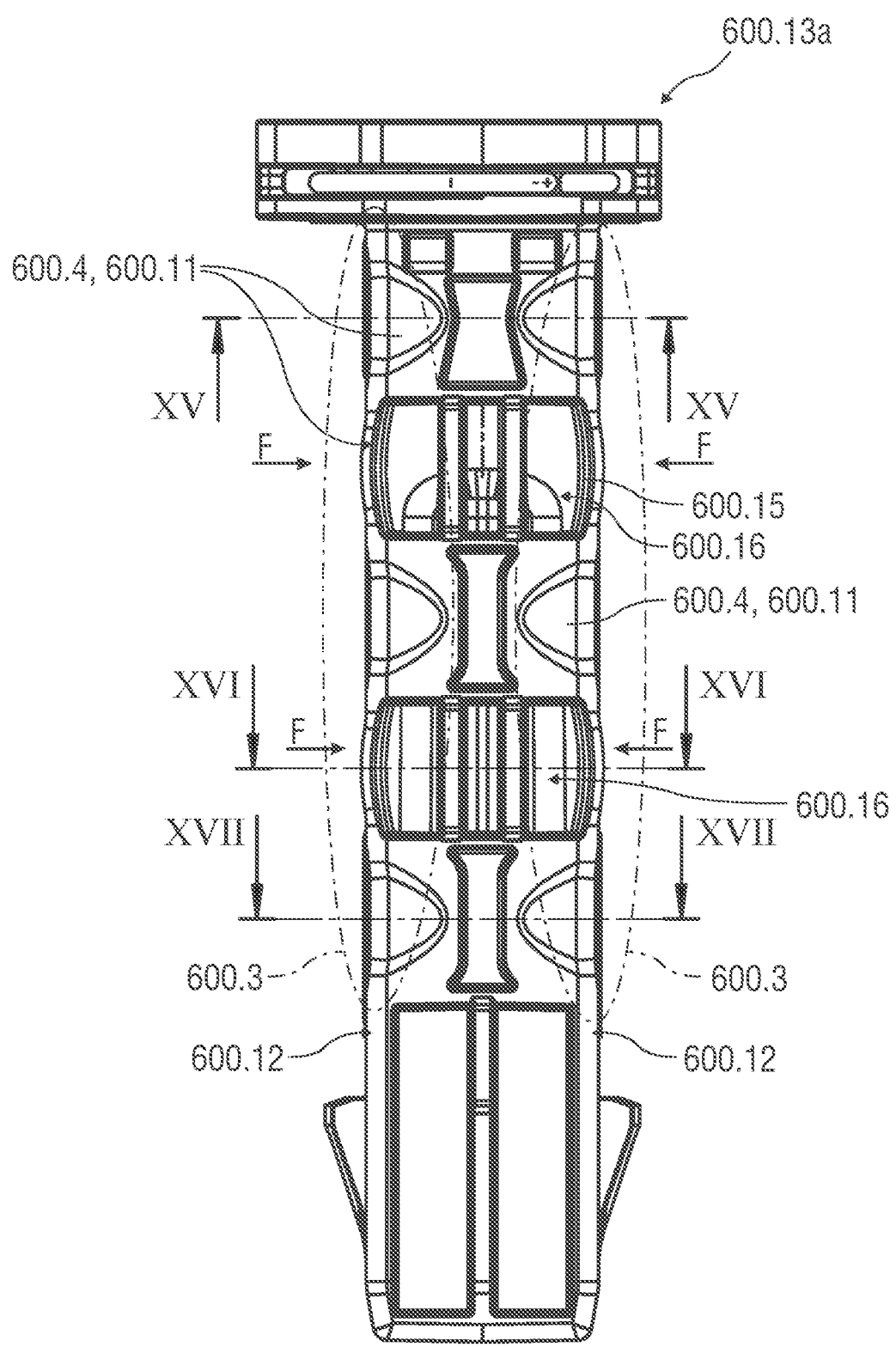

FIG. 12 shows the sleeve side 600.13*a* as one of the sleeve sides with two longitudinal edges 600.12 and two coupling sections 600.3.

Figure 13:
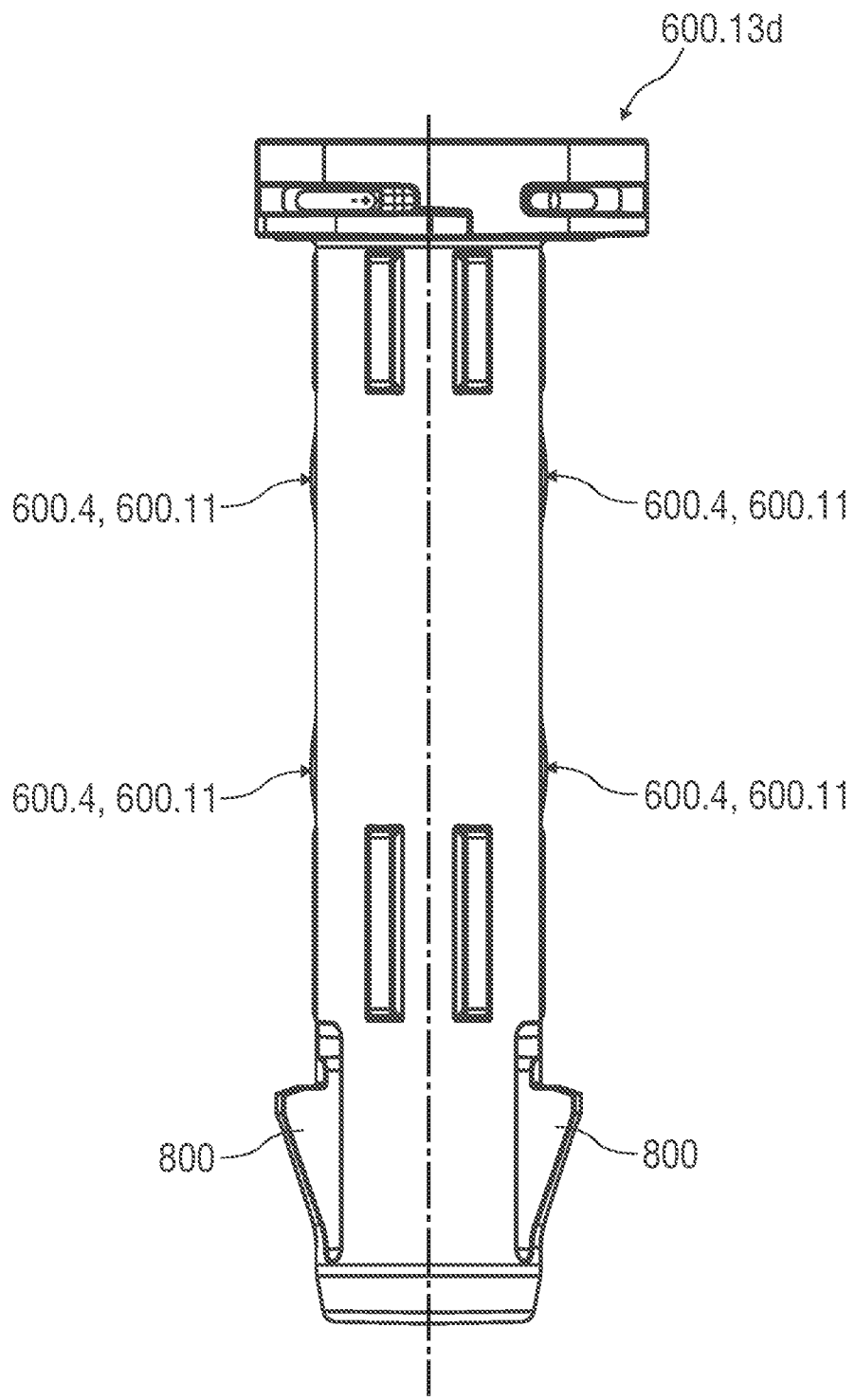

FIG. 13 shows the sleeve side 600.13*d* as one of the sleeve sides without coupling sections 600.3.

Figure 14:
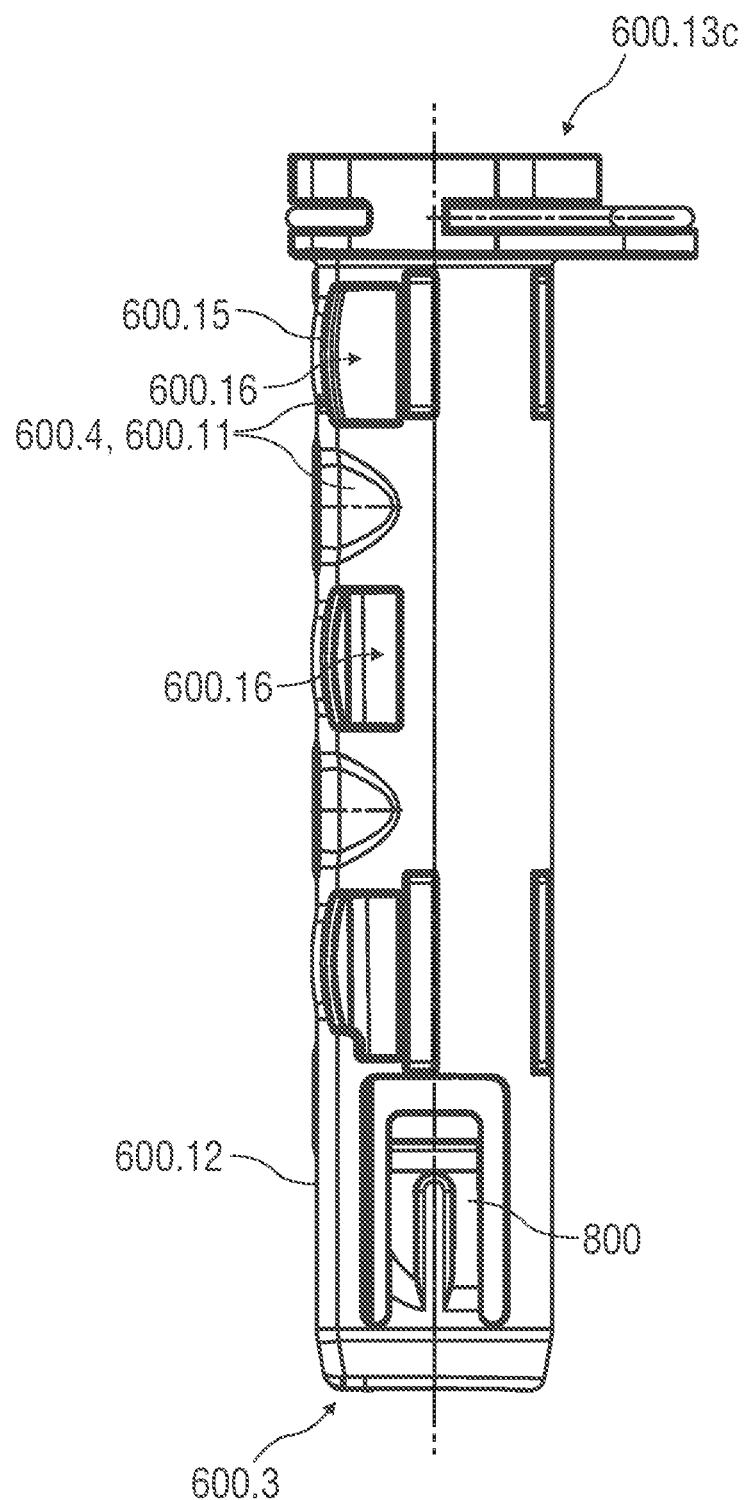

FIG. 14 shows the sleeve side 600.13*c* as one of the sleeve sides along one of the longitudinal edges 600.12 and with one coupling section 600.3.

Figure 15:
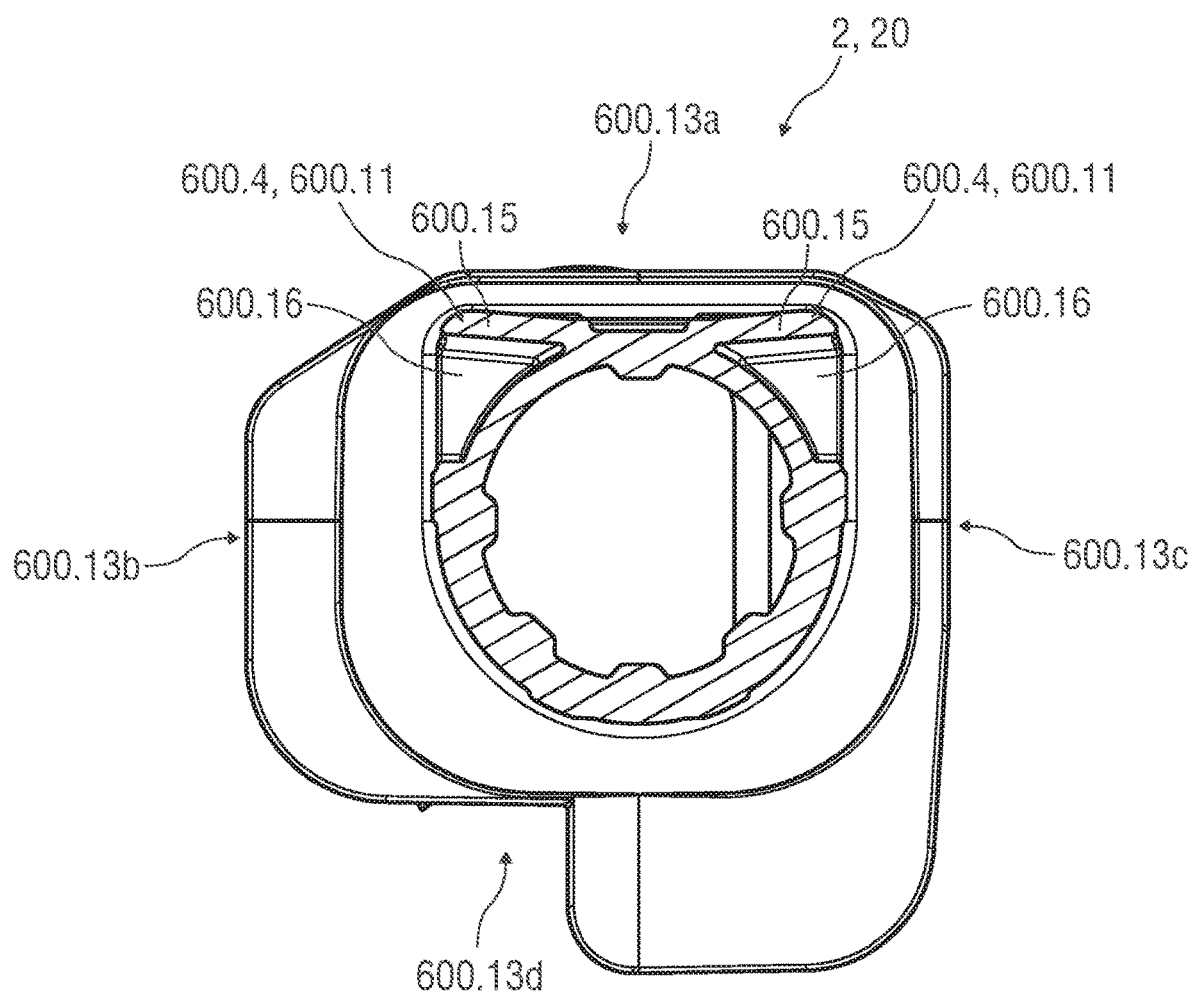
FIGS. 15 to 17 are schematic cross-sections of the embodiment according to FIG. 12.
Figure 16:
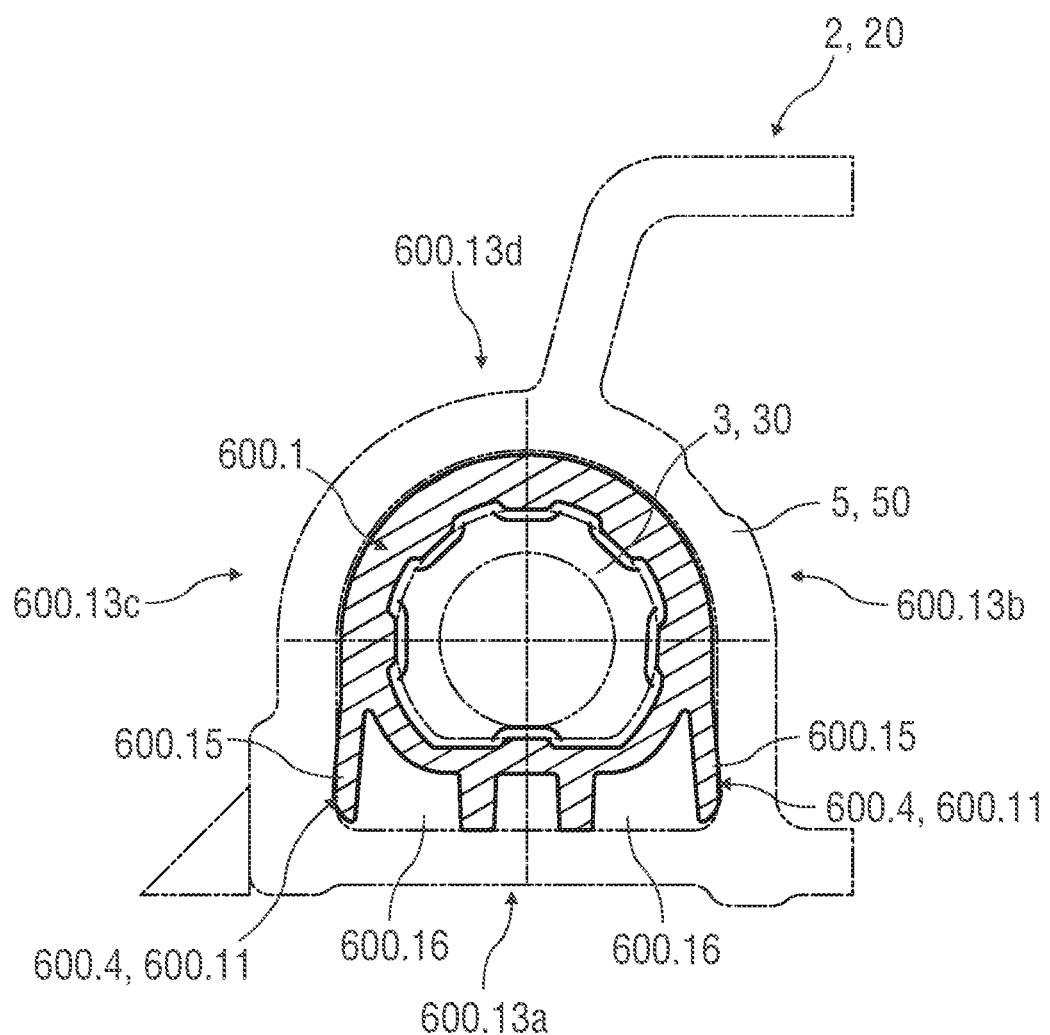
Figure 17:
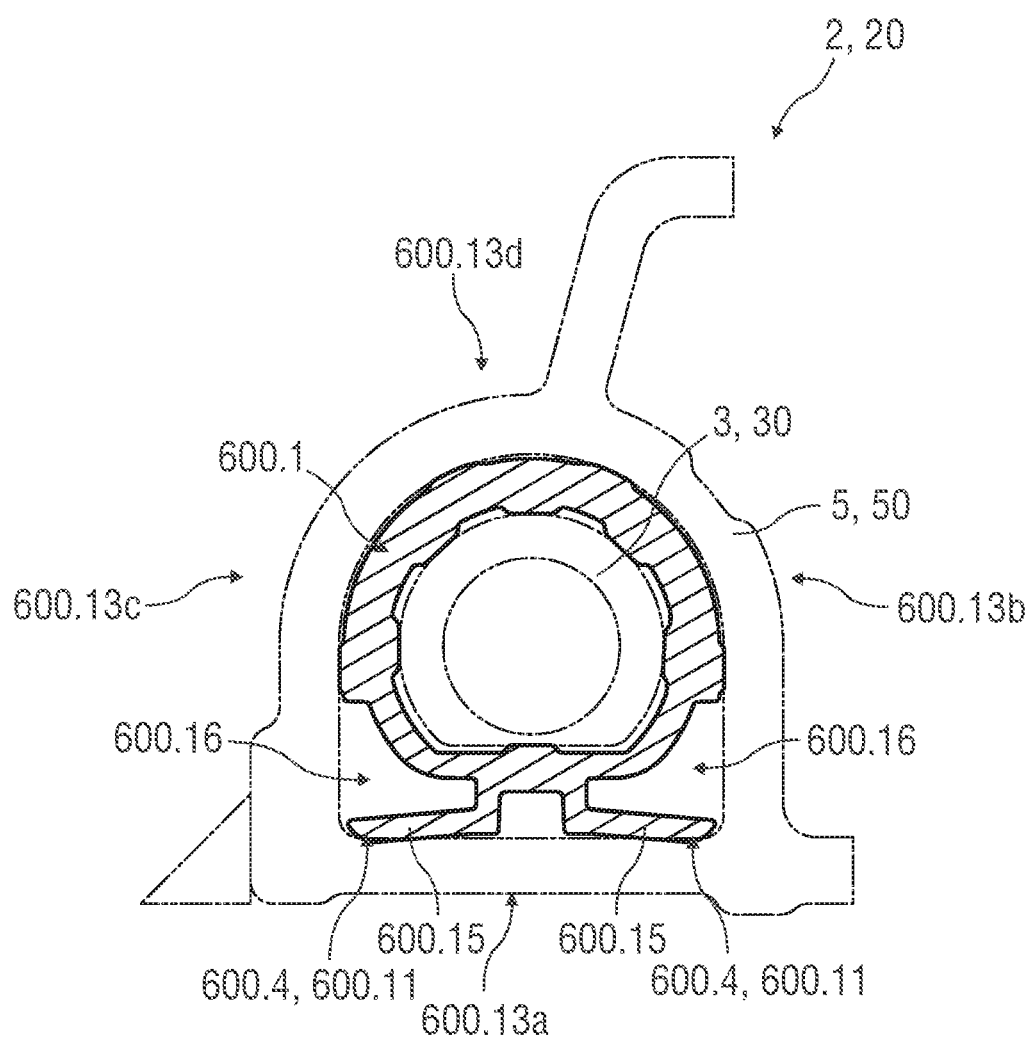

FIGS. 15 to 17 show schematically cross-sections of the embodiment of the sliding sleeve 600 according to FIG. 12.

As shown in FIGS. 16 and 17, a headrest arrangement 2 or 20 comprises a headrest rod 3 or 30 and a securing support 5 or 50 which are arrangeable and fixable in a frame of a backrest of the seat (shown in FIGS. 1A to 1C) and the sliding sleeve 600 with the above described at least two flexible coupling faces 600.4 configured to be at least one arranged above and arranged next to one another in the longitudinal direction, wherein an outer surface 600.11 of each of the flexible coupling faces 600.4 has a convex shape.

Alternatively or additionally, the sleeve body 600.1 comprises a cross-section comprising a circular sector 600.13*d* and at least one corner 600.14, so that the sleeve body 600.1 has a longitudinal edge 600.12, wherein the flexible coupling face 600.4 comprises at least two flexible coupling faces arranged in a consecutive manner along the edge 600.12 and alternating between one sleeve side 600.13*a* of the edge 600.12 and the other sleeve side 600.13*b* of the edge 600.12.

While specific embodiments of the invention have been shown and described in detail to illustrate the application of the principles of the invention, it will be understood that the invention may be embodied otherwise without departing from such principles.

APPENDIX

List of Reference Numerals

| | |
|---|---|
| 1 | Seat |
| 1.1 | Backrest |
| 1.2, 10.2 | Frame |
| 2, 20 | Headrest arrangement |
| 3, 30 | Headrest rods |
| 4 | Headrest body |
| 5, 50 | Securing support |
| 6, 60 | Sliding sleeve |
| 6.1, 60.1 | Flange section |
| 6.2, 60.2 | Sleeve body |
| 6.3, 60.3 | Coupling section |
| 6.4, 60.4 | Coupling face |
| 6.5, 60.5 | Cavity |
| 6.6, 60.6 | Wall |
| 6.7, 60.7 | Web |
| 6.8, 60.8 | Reinforcing rib |
| 6.9, 60.9 | Reinforcing web |
| 6.10, 60.10 | Fastening web |
| 6.11, 60.11 | Bridge wall |
| 50.1 | Latching receptacle |
| 7, 70 | Sliding element |
| 8, 80 | Fastening means |
| 90 | Actuating means |
| 91 | Latching receptacle |
| AP | Outer profile |
| E1, E2 | End |
| IP | Inner profile |
| Y, −Y | Transverse directions |
| 600 | sliding sleeve |
| 600.1 | sleeve body |
| 600.3 | coupling section |
| 600.3a | retaining portion |
| 600.4 | flexible coupling face |
| 600.5 | cavity |
| 600.6 | wall portion |
| 600.11 | outer surface |
| 600.12 | longitudinal edge/s |
| 600.13a-600.13d | outer sleeve side/s |
| 600.14 | corner |
| 600.15 | wall portion |
| 600.16 | opening |
| 800 | fastener |

What is claimed is:

1. A sliding sleeve for fixing in a securing body for a vehicle seat headrest, the sliding sleeve comprising:
   a sleeve body with an exterior surface, said sleeve body extending along a longitudinal axis, said sleeve body having a coupling section with at least one flexible coupling face for bearing against a securing support,
   wherein an inner surface of said at least one flexible coupling face and said exterior surface form two sides of a wedge-shaped opening, wherein a third side of said wedge-shaped opening is only accessible from an outer sleeve side,
   wherein an outer surface of the at least one flexible coupling face has a convex shape along the longitudinal axis to radially secure the sleeve body against the securing support.

2. A sliding sleeve according to claim 1, wherein the outer surface of each of the flexible coupling faces is dome-shaped.

3. A sliding sleeve according to claim 1, wherein the outer surface of each of the flexible coupling faces is half-dome-shaped.

4. A sliding sleeve according to claim 1, wherein the outer surface of each of the flexible coupling faces is convex in a non-installed state, so that in an installed state the convex outer surface is compressed and is changed into a stressed state.

5. A sliding sleeve according to claim 1, wherein the sleeve body comprises at least one longitudinal edge wherein two flexible coupling faces are arranged at least 90° or at least 180° to each other along the at least one longitudinal edge.

6. A sliding sleeve according to claim 5, wherein the sliding sleeve is at least one of square, or rectangular in cross-section and comprises outer sleeve sides next to one another wherein the at least two flexible coupling faces are arranged on outer sleeve sides arranged next to one another.

7. A sliding sleeve according to claim 5, wherein the sliding sleeve is at least one of square, or rectangular in cross-section and comprises outer sleeve sides opposite to one another wherein the at least two flexible coupling faces are arranged on outer sleeve sides arranged opposite to one another.

8. A sliding sleeve according to claim 1, wherein the outer surface is beveled, wherein said at least one flexible coupling face, being arranged in the coupling section, additionally comprises a wall portion with a fully enclosed cavity within the wall portion, wherein the least one fully enclosed cavity is covered to an outside by the bevelled outer surface.

9. A sliding sleeve according to claim 8, wherein the cavity extends in a longitudinal direction of the sleeve body.

10. A sliding sleeve according to claim 1, wherein a length of the cavity in the longitudinal direction is greater than a depth of the cavity in the wall portion.

11. A sliding sleeve for fixing in a securing body for a vehicle seat headrest, the sliding sleeve comprising:
a sleeve body with an exterior surface, said sleeve body extending along a longitudinal axis, said sleeve body having a coupling section with first and second longitudinally aligned coupling faces,
wherein each coupling face has an inner end, an opposite outer end, an inner surface and an opposite outer surface,
wherein said outer surfaces and said outer ends are adapted to bear against a securing support,
wherein said inner ends are connected to said exterior surface,
wherein said outer ends radially extend from said inner ends,
wherein inner surfaces and said exterior surface define an indentation between them,
wherein said indentation is only accessible from an outer sleeve side,
wherein an outer surface of the at least one flexible coupling face has a convex shape along the longitudinal axis to radially secure the sleeve body against the securing support.

12. A sliding sleeve according to claim 11, wherein said outer surface of each of the flexible coupling faces has a convex shape.

13. A sliding sleeve according to claim 11, wherein the outer surface of each of the flexible coupling faces is dome-shaped.

14. A sliding sleeve according to claim 11, wherein the outer surface of each of the flexible coupling faces is half-dome-shaped.

15. A sliding sleeve according to claim 11, wherein the outer surface of each of the flexible coupling faces is convex in a non-installed state, so that in an installed state the convex outer surface is compressed and is changed into a stressed state.

16. A headrest arrangement, in particular for a seat, comprising:
two headrest rods which are spaced apart from one another in parallel;
a headrest body which is fastened to the headrest rods;
two securing supports which are arrangeable and fixable in a frame of a backrest of the seat; and
sliding sleeves, each of the sliding sleeves being arranged in a respective one of the securing supports and each of the sliding sleeves comprising a sleeve body with an exterior surface, said sleeve body extending along a longitudinal axis, said sleeve body having a coupling section with first and second longitudinally aligned coupling faces,
wherein each coupling face has an inner end, an opposite outer end, an inner surface and an opposite outer surface,
wherein said outer surfaces and said outer ends are adapted to bear against one of said securing supports,
wherein said inner ends are connected to said generally cylindrical exterior surface,
wherein said outer ends radially extend from said inner ends,
wherein inner surfaces and said exterior surface define a generally wedge-shaped opening between them,
wherein said opening is only accessible from an outer sleeve side,
wherein outer surfaces of said coupling faces each have a convex shape along the longitudinal axis to radially secure the sleeve body against the securing support.

17. A headrest arrangement according to claim 16, wherein the outer surface of each of the flexible coupling faces is dome-shaped.

18. A headrest arrangement according to claim 16, wherein the outer surface of each of the flexible coupling faces is half-dome-shaped.

19. A headrest arrangement according to claim 16, wherein the outer surface of each of the flexible coupling faces is convex in a non-installed state, so that in an installed state the convex outer surface is compressed and is changed into a stressed state.

20. A sliding sleeve according to claim 1, wherein at least one latching lug is one piece with the sliding sleeve.

21. A sliding sleeve according to claim 1, wherein at least one latching lug is at least partially cut out from the sleeve body.

22. A sliding sleeve according to claim 1, wherein at least one latching lug is located above or below the at least one coupling face, or on an opposite side of the sleeve body from the at least one coupling face.

23. The sliding sleeve of claim 1, wherein said at least one coupling face comprises two flexible coupling faces that are tangentially connected to said exterior surface to extend therefrom, wherein said two flexible coupling faces extend in opposite directions and said two flexible coupling faces are located at the same longitudinal axial position on the sleeve body.

24. The sliding sleeve of claim 23, wherein two flexible coupling faces and said exterior surface define two wedge-shaped openings between them, respectively.

25. The sliding sleeve of claim 24, wherein said two wedge shaped openings are located at the same longitudinal axial position on the sleeve body.

* * * * *